US008666252B2

(12) United States Patent  (10) Patent No.: US 8,666,252 B2
Nishihara et al.  (45) Date of Patent: Mar. 4, 2014

(54) OPTICAL NETWORK SYSTEM

(75) Inventors: Masato Nishihara, Kawasaki (JP);
Tomoo Takahara, Kawasaki (JP);
Toshiki Tanaka, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 192 days.

(21) Appl. No.: 13/420,043

(22) Filed: Mar. 14, 2012

(65) Prior Publication Data

US 2012/0237212 A1    Sep. 20, 2012

(30) Foreign Application Priority Data

Mar. 16, 2011  (JP) ................................. 2011-058545

(51) Int. Cl.
*H04B 10/00*    (2013.01)
(52) U.S. Cl.
USPC ............................................. 398/83; 398/48
(58) Field of Classification Search
USPC ............................................... 398/45–57, 83
See application file for complete search history.

(56) References Cited

U.S. PATENT DOCUMENTS

| 4,821,255 | A  | * | 4/1989 | Kobrinski ........................ 398/79 |
| 7,983,560 | B2 | * | 7/2011 | Maki et al. ....................... 398/50 |
| 8,542,999 | B2 | * | 9/2013 | Barnard et al. ................... 398/79 |
| 2002/0186725 | A1 | * | 12/2002 | Araki ............................. 370/539 |
| 2012/0051745 | A1 | * | 3/2012 | Srinivasan et al. ............... 398/58 |
| 2012/0237212 | A1 | * | 9/2012 | Nishihara et al. ................ 398/26 |
| 2013/0101299 | A1 | * | 4/2013 | Bellot et al. .................... 398/139 |
| 2013/0259478 | A1 | * | 10/2013 | Komaki .......................... 398/58 |

FOREIGN PATENT DOCUMENTS

| JP | 8-97771 | 4/1996 |
| JP | 2002-315027 | 10/2002 |
| JP | 2005-286736 | 10/2005 |

* cited by examiner

*Primary Examiner* — Agustin Bello
(74) *Attorney, Agent, or Firm* — Staas & Halsey LLP

(57) ABSTRACT

There is provided an optical network system in which optical signals modulated by each of at least two modulation methods are wavelength-division-multiplexed and transferred, including: an optical transmitter configured to transmit first optical signals modulated by each of at least two modulation methods; an add-drop multiplexer configured to drop second optical signals from wavelength-division-multiplexed optical signals transferred in the optical network system, and add the first optical signals to the wavelength-division-multiplexed optical signals; an optical receiver configured to demodulate the second optical signals corresponding to each of at least two modulation methods; and a controller configured to control wavelengths of the first optical signals, the second optical signals and the wavelength-division-multiplexed optical signals so as to rearrange wavelengths of the first optical signals, the second optical signals and the wavelength-division-multiplexed optical signals so that optical signals modulated by a same modulation method are placed on an adjacent wavelength.

8 Claims, 25 Drawing Sheets

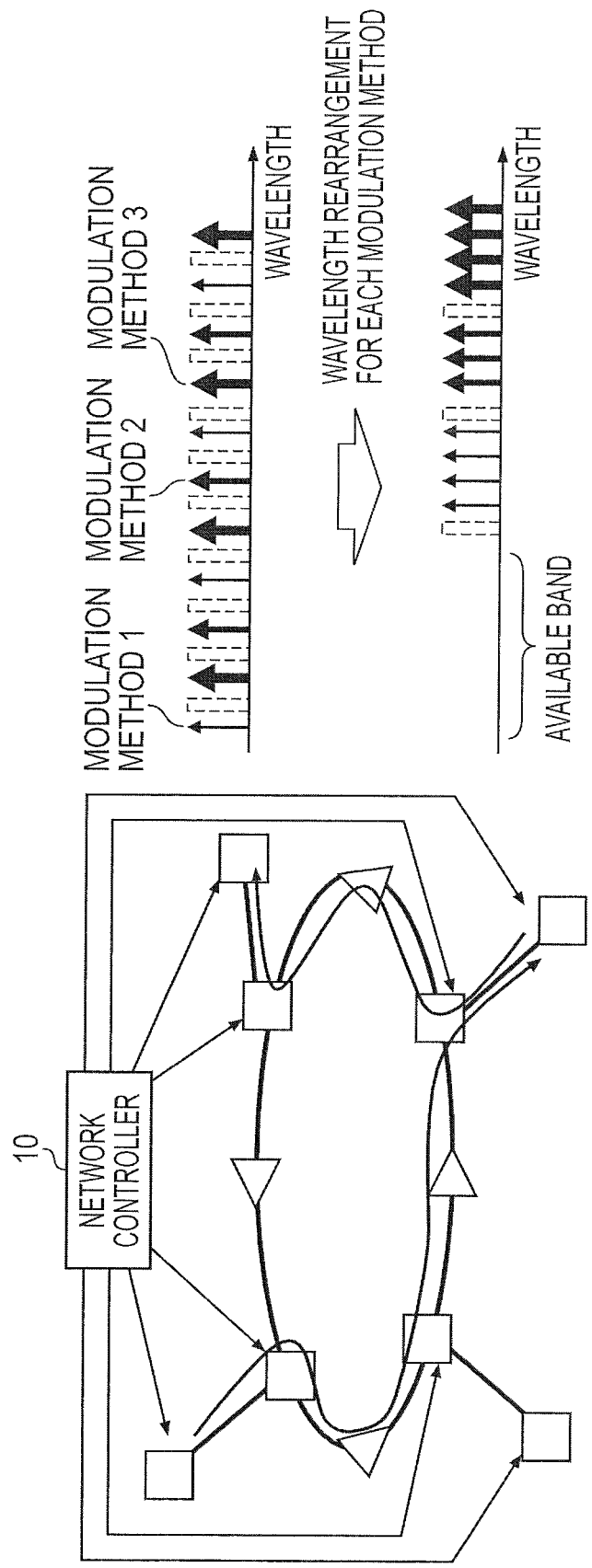

FIG. 5

MOVING TARGET SIGNAL

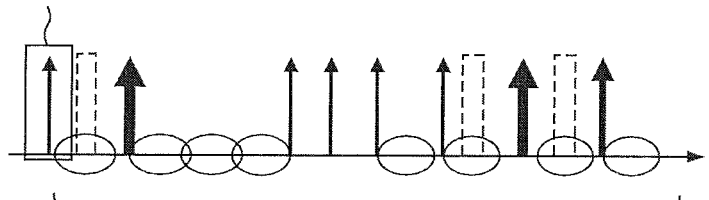

CALCULATE EVALUATION VALUE FOR
EACH WAVELENGTH

MAXIMUM VALUE OF EVALUATION VALUES OF
VACANT WAVELENGTHS > EVALUATION VALUE
OF CURRENT WAVELENGTH

MOVE SIGNAL TO WAVELENGTH OF
MAXIMUM EVALUATION VALUE

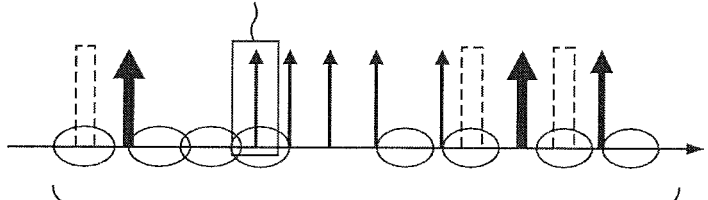

CALCULATE EVALUATION VALUE FOR
EACH WAVELENGTH

MAXIMUM VALUE OF EVALUATION VALUES OF
VACANT WAVELENGTHS ≤ EVALUATION VALUE
OF CURRENT WAVELENGTH

CHANGE MOVING TARGET SIGNAL

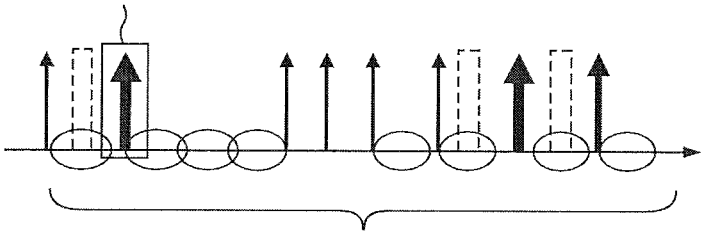

CALCULATE EVALUATION VALUE FOR
EACH WAVELENGTH

FIG. 7
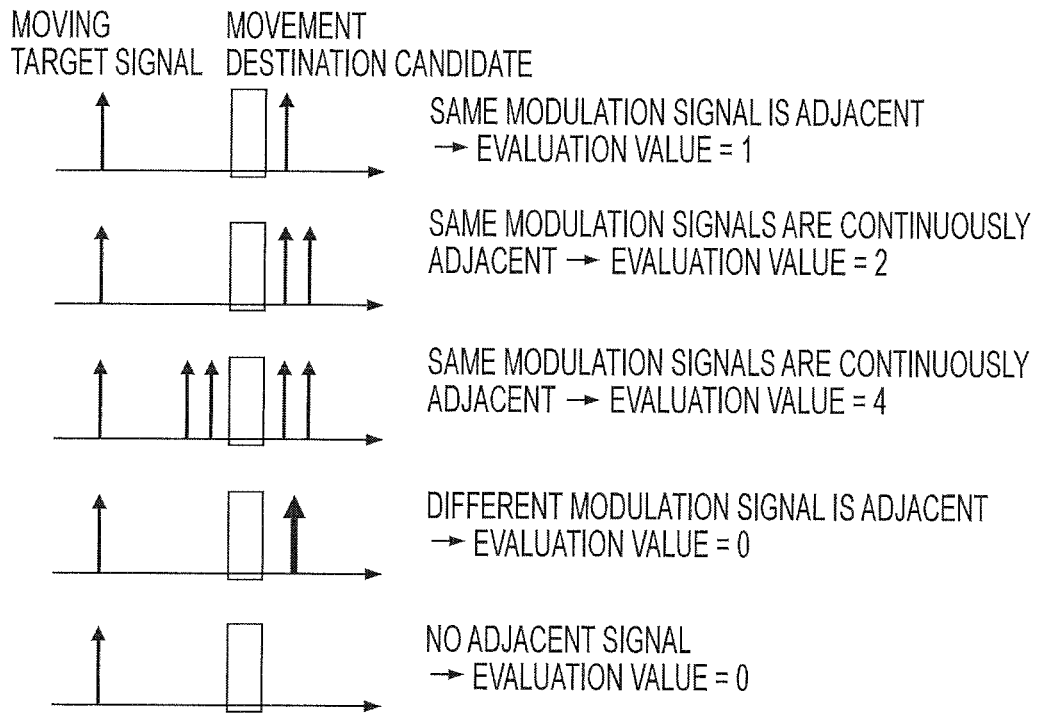
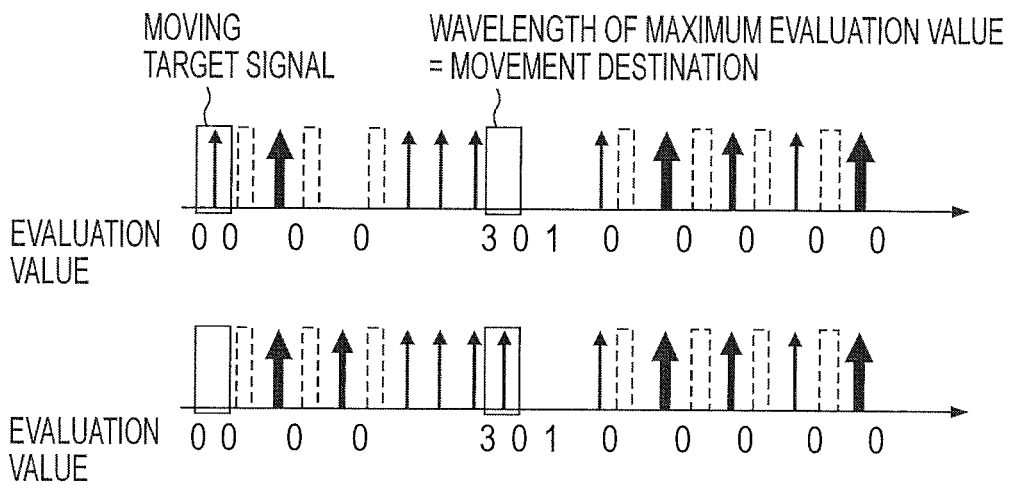

FIG. 22
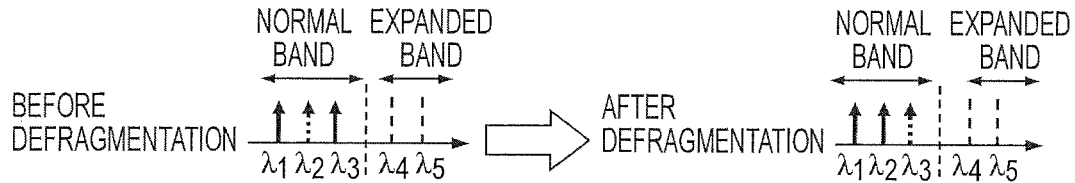
(5) $\lambda_4 \rightarrow \lambda_3$ IN SIMILAR PROCESS TO (1) TO (3)
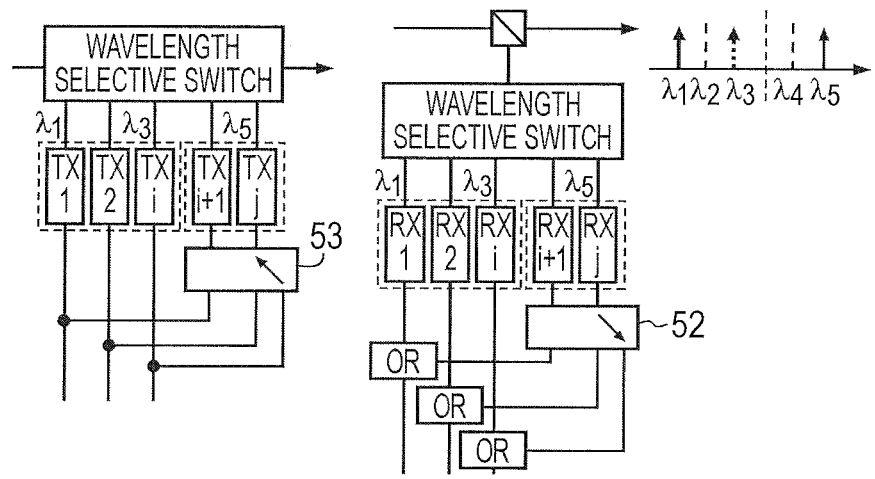
(6) $\lambda_5 \rightarrow \lambda_2$ IN SIMILAR PROCESS TO (1) TO (3)
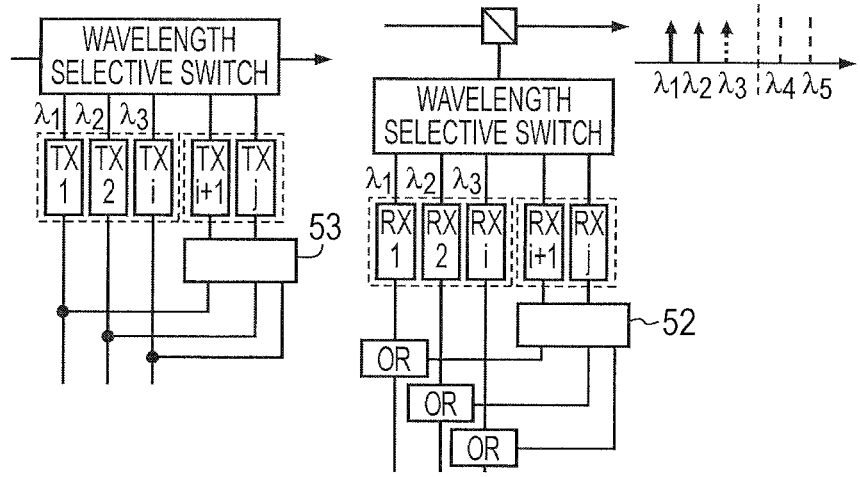

OPTICAL NETWORK SYSTEM

CROSS-REFERENCE TO RELATED APPLICATION

This application is based upon and claims the benefit of priority of the prior Japanese Patent Application No. 2011-058545, filed on Mar. 16, 2011, the entire contents of which are incorporated herein by reference.

FIELD

The embodiments discussed herein are related to an optical network system in which optical signals of a plurality of modulation methods are wavelength-multiplexed and transferred.

BACKGROUND

In recent years, demand for introducing a next-generation optical transmission system which has transmission capacity of 40 Gbit/s or more has been increased as transmission traffic is increased. As a realizing method to introduce the next-generation optical transmission system, various modulation methods which have more excellent spectral efficiency, optical signal to noise ratio (OSNR) tolerance, and nonlinearity tolerance than those of a non return to zero (NRZ) modulation method which has been employed in a related art system have been employed. For example, as a modulation method of transmission capacity of 40 Gbit/s, a differential phase shift keying (DPSK) modulation method, a differential quadrature phase shift keying (DQPSK) modulation method, and the like are employed. Among the methods, two-bit data can be transmitted by one modulation of multi-level modulation in the DQPSK modulation method, so that the DQPSK modulation method has features such as high dispersion tolerance, high polarization mode dispersion (PMD) tolerance, and narrow spectrum and is expected as a modulation method of a next-generation optical transmission system. For example, modulation rate (baud rate) when a system obtains transmission capacity of 40 Gbit/s is 40 Gbit/s in the DPSK modulation method and 20 Gbit/s in the DQPSK modulation method.

In order to realize further capacity increase and property (OSNR tolerance, wavelength dispersion tolerance) improvement of the DQPSK modulation method, a modulation method in which a polarization multiplexing technique and a digital coherent receiving technique are combined has been actively developed in recent years. The polarization multiplexing technique is a technique to double the number of bits of modulation by modulating optical signals of respective polarization waves by different data signals. Combining the polarization multiplexing technique and the DQPSK modulation method enables four-bit transmission by one modulation, so that the combination has been regarded to be more likely applied to a 40 Gbit/s transmission system (baud rate 10 Gbit/s), a 100 Gbit/s transmission system (baud rate 25 Gbit/s), and the like.

FIGS. 1 to 2B illustrate a related art. As illustrated, signals of various modulation methods are mixed in an optical network system and modulation methods of signals of respective wavelengths are different from each other. Especially, if optical signals of modulation methods of which baud rates are different from each other are placed on adjacent wavelength positions, transmission performance is degraded. As a method for avoiding degradation of transmission performance, such method that a certain interval (guard band, refer to FIG. 1) is provided next to a wavelength position of an optical signal is employed. However, if optical signals of different modulation methods are arranged on random wavelength positions, a guard band has to be provided for each wavelength. Accordingly, a rate of guard bands in which no signals actually exist becomes large even in a signal band, degrading spectral efficiency. Therefore, in order to efficiently use a wavelength band, it is important to arrange optical signals of the same modulation method in a wavelength direction in a concentrated manner to reduce the number of guard bands in a signal band.

On the other hand, in an optical network system employing a reconfigurable optical add-drop multiplexer (ROADM) device, transmission paths are switched in response to request from a network controller 10, as illustrated in FIG. 2A. If the path switch is frequently performed, optical signals of various modulation methods are arranged in a random manner (fragmented) in the wavelength direction. Accordingly, the number of places on which optical signals of different modulation methods are adjacent to each other is increased and the number of guard bands is increased as well (refer to FIG. 1). As a result, spectral efficiency is degraded and transmission capacity of the whole system is decreased.

Therefore, as illustrated in FIG. 2B, optical signals of the same modulation method have to be placed on adjacent wavelength positions by rearranging wavelength positions of fragmented optical signal. Accordingly, the number of guard bands can be reduced and optical signals can be arranged closer in a wavelength band, being able to enhance spectral efficiency. By arranging more optical signals in a band which becomes available by the enhancement of the usage efficiency of the wavelength band, transmission capacity can be increased. However, the configuration for the enhancement of the usage efficiency has not concretely proposed in related art.

In related art, a wavelength group wavelength converter which demultiplexes a wavelength multiplexed signal for each wavelength and converts wavelengths of each wavelength so as to multiplex the wavelengths and the configuration including a wavelength group converting device including the wavelength group wavelength converter, the configuration that switches a wavelength of a variable wavelength transponder, the configuration that changes wavelength arrangement so as to make four-wave mixing crosstalk equal to or lower than a predetermined value, and the like are disclosed. Japanese Laid-open Patent Publication Nos. 2002-315027, 2005-286736, and 8-97771 are examples of related art.

SUMMARY

According to an aspect of the embodiment, there is provided an optical network system in which optical signals modulated by each of at least two modulation methods are wavelength-division-multiplexed and transferred, the optical network system including: an optical transmitter configured to transmit first optical signals modulated by each of at least two modulation methods; an add-drop multiplexer configured to drop second optical signals from wavelength-division-multiplexed optical signals transferred in the optical network system, and add the first optical signals to the wavelength-division-multiplexed optical signals; an optical receiver configured to demodulate the second optical signals corresponding to each of at least two modulation methods; and a controller configured to control wavelengths of the first optical signals, the second optical signals and the wavelength-division-multiplexed optical signals so as to rearrange wavelengths of the first optical signals, the second optical signals and the wavelength-division-multiplexed optical signals so that optical signals modulated by a same modulation method are placed on an adjacent wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B illustrate a related art (II);

FIG. 5 illustrates a flow of an operation of wavelength defragmentation (I);

FIG. 7 illustrates the flow of the operation of the wavelength defragmentation (III);

FIG. 22 illustrates the second configuration of the embodiment (III);

DESCRIPTION OF EMBODIMENTS

First Embodiment

FIGS. 3A to 4B illustrate an embodiment of the present technology. Part (1) in FIG. 3B illustrates an arrangement of optical signals which are fragmented in a wavelength direction due to path change. Arrows having different thicknesses represent optical signals of different modulation methods. A guard band (dotted line) is provided between optical signals of different modulation methods. At this state, according to an instruction from a network controller 10 illustrated in FIG. 3A, wavelengths of optical transmitting/receiving devices 11-1 to 11-4 and paths of ROADM devices 12-1 to 12-4 are changed so as to gather wavelength positions of the optical signals so that optical signals of the same modulation method are arranged on adjacent wavelength positions, for each modulation method. Accordingly, the number of guard bands can be reduced as illustrated in part (3) in FIG. 3B, being able to improve wavelength usage efficiency. An operation that fragmented optical signals are rearranged so that optical signals of same modulation method are arranged on adjacent wavelength positions for every modulation method is called wavelength defragmentation (sometimes abbreviated to defrag).

If the number of vacant wavelengths of an optical network system is low when the wavelength defragmentation is performed, the number of wavelength arrangement changing times is increased and performing time of the wavelength defragmentation is increased. Accordingly, as illustrated in part (2) in FIG. 3B, wavelength bands of optical amplifiers 13-1 to 13-4 are temporarily expanded in the performance of the wavelength defragmentation so as to rearrange wavelengths by using the expanded wavelength bands. After the completion of the wavelength rearrangement, the wavelength bands of the optical amplifiers 13-1 to 13-4 are returned to the original.

Figure 1:
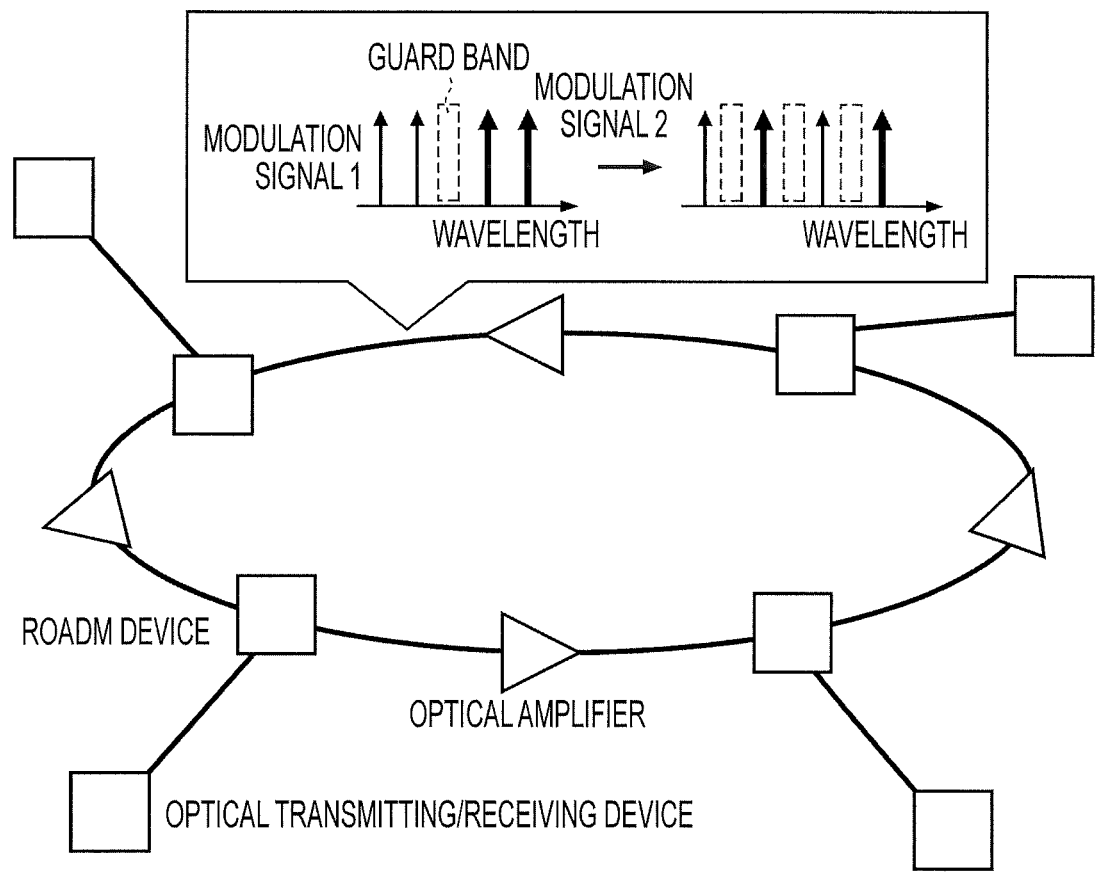
FIG. 1 illustrates a related art (I)
Figure 3B:
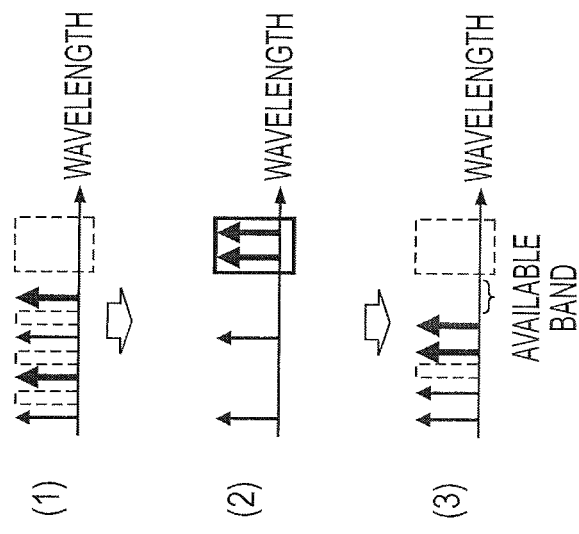
FIGS. 3A and 3B illustrate an embodiment (I)
Figure 3A:
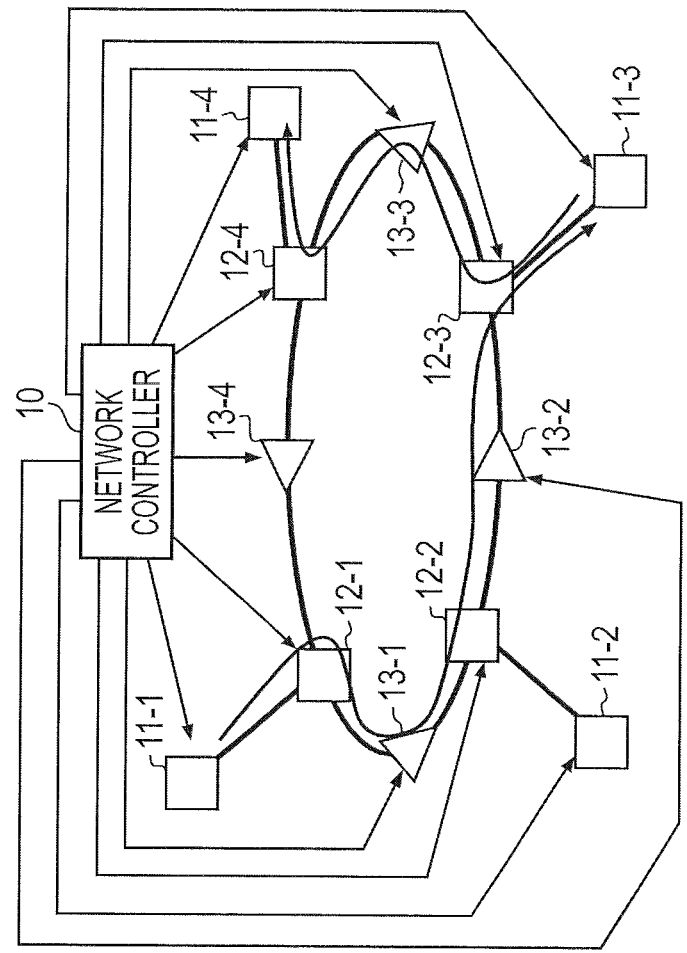
Figure 4A:
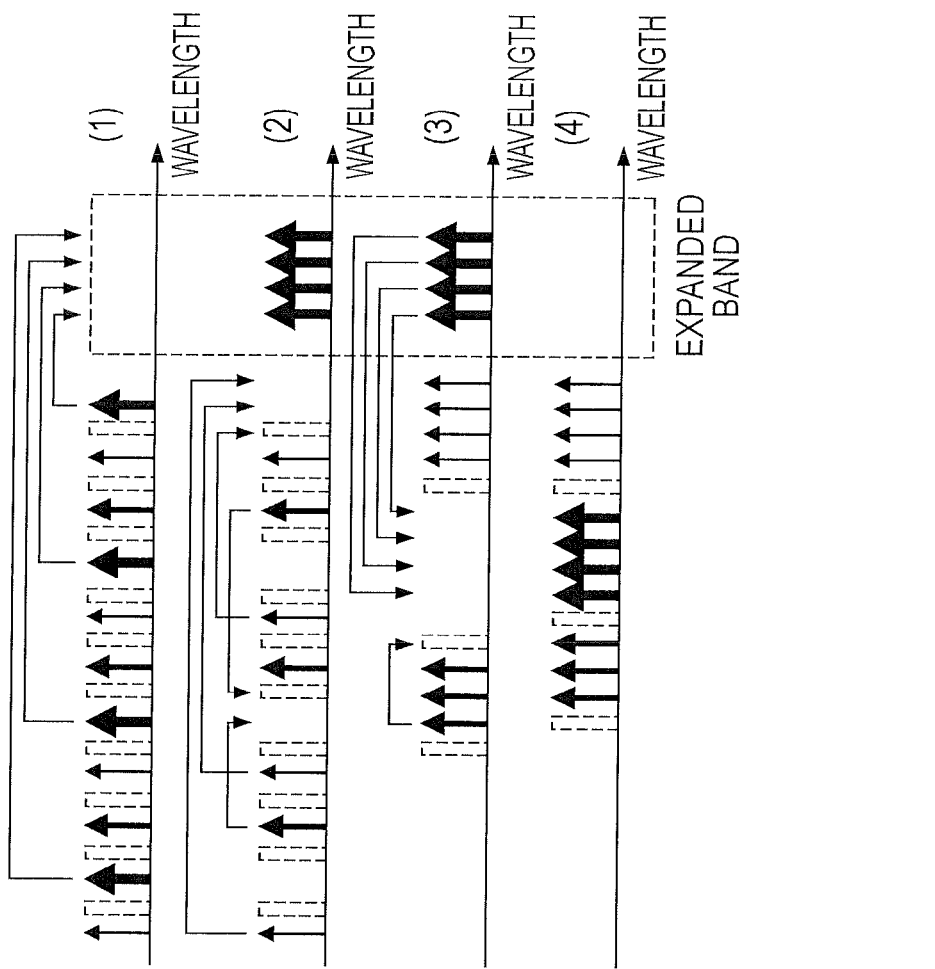
FIGS. 4A and 4B illustrate the embodiment (II)
Figure 4B:
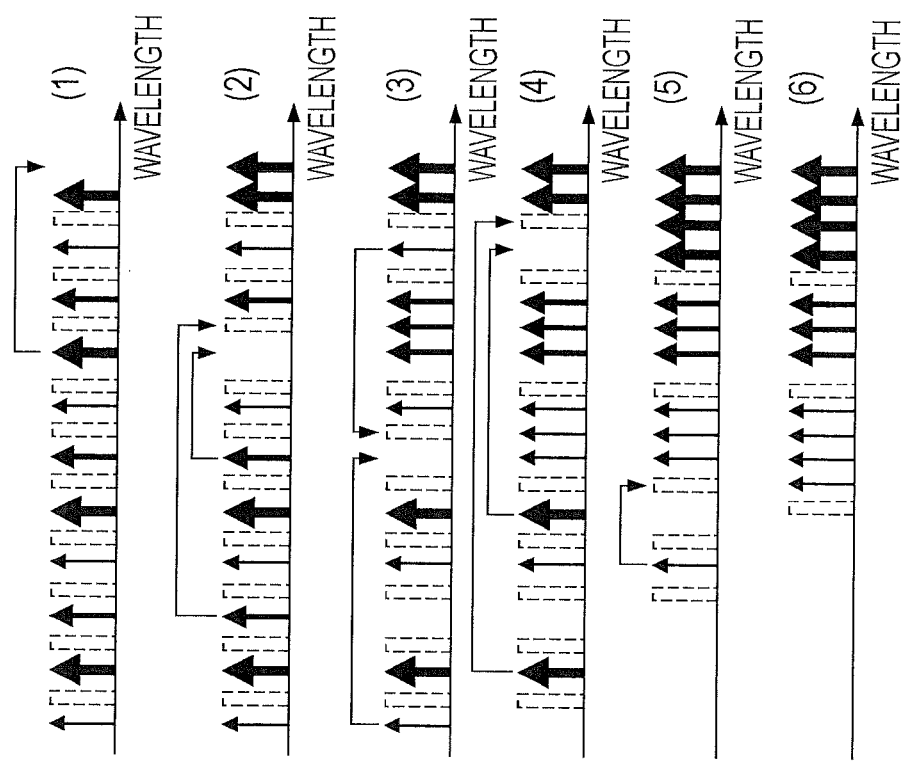

FIGS. 4A and 4B illustrate an example of an operation of the embodiment. In FIGS. 4A and 4B, upturned arrows represent optical signals of each wavelength and optical signals which are represented by arrows having different thicknesses represent optical signals of different modulation methods. A rectangle depicted by a dotted line represents a guard band.

FIG. 4A illustrates an example that wavelength defragmentation is performed without performing expanding band, and FIG. 4B illustrates an example that wavelength defragmentation is performed with the performance of expanding band. By performing the wavelength defragmentation, spectral efficiency can be enhanced. Further, by performing the expanding band, the number of performing times of wavelength arrangement change can be reduced and as a result, performance time of the wavelength defragmentation can be reduced.

In FIG. 4A, the wavelength defragmentation is performed without performing the expanding band. Part (1) in FIG. 4A illustrates a state that wavelength positions of optical signals of each modulation method are fragmented and wavelength positions are aligned in a random manner. In this case, guard bands are provided between respective optical signals so as to avoid degradation of transmission performance due to mutual effect of the optical signals. The wavelength defragmentation is performed in this state.

First, one of optical signals depicted by the thickest arrows is moved to an outermost wavelength position as depicted by an upside arrow of part (1). Then, as illustrated in part (2), two optical signals depicted by arrows having an intermediate thickness are moved to wavelength positions that have become vacant due to the movement of part (1) and are adjacent to another optical signal beam which is depicted by an arrow having an intermediate thickness. At this time, one of the guard bands may not be used. Subsequently, as illustrated in part (3), optical signals depicted by thin arrows are moved to the wavelength position which is vacant due to the movement of part (2) so that thin arrows are gathered. All optical signals depicted by thick arrows are moved to wavelength positions adjacent to each other in part (4), and last optical signal depicted by a thin arrow is moved to a wavelength position adjacent to other optical signals depicted by thin arrows in part (5). Accordingly, arrows of respective thicknesses are moved to the wavelength positions to be gathered for respective thicknesses as illustrated in part (6). Thus, the wavelength defragmentation is completed.

FIG. 4B illustrates a case where the wavelength defragmentation is performed with the performance of the expanding band. Part (1) illustrates a state that wavelength positions of optical signals of each thickness are fragmented and many guard bands are provided. First, as depicted by upside arrows of part (1), all optical signals depicted by thick arrows are moved to a wavelength band which is expanded by the expanding band. Next, as illustrated in part (2), optical signal depicted by thin arrows and optical signal depicted by intermediate thick arrows are moved to adjacent wavelength positions respectively by using bands which are generated by the movement of the optical signal depicted by thick arrows. Then, as illustrated in part (3), all optical signals which are depicted by thick arrows and moved in part (1) are moved to a band which has become vacant by respectively gathering the optical signals which are depicted by thin arrows and intermediate thick arrows. Accordingly, the expanding band is ended in part (4), and the wavelength band is turned to the original. Thus, the wavelength defragmentation is completed.

When FIG. 4A and FIG. 4B are compared to each other, the wavelength defragmentation of a case where the expanding band is not performed as illustrated in FIG. 4A includes six operations, while the wavelength defragmentation of a case where the expanding band is performed as illustrated in FIG. 4B includes only four operations. Thus, it is understood that the wavelength defragmentation with the performance of the expanding band can be completed by fewer operations.

FIGS. 5 to 11 illustrate a flow of operations of the wavelength defragmentation. As illustrated in FIG. 5, estimation values of respective wavelengths including vacant wavelengths of the optical network are calculated after determination of a moving target signal. The calculating method of estimation values will be described later with reference to FIG. 7. When the maximum value of evaluation values of the vacant wavelengths is larger than an evaluation value of a current wavelength of the moving target signal, the moving target signal is moved to a wavelength of the maximum evaluation value. When the maximum value of the evaluation value of vacant wavelengths is equal to or smaller than the evaluation value of the current wavelength of the moving target signal, the current moving target signal is not moved and the moving target signal is changed.

Determination of a moving target signal and calculation and comparison of an evaluation value are performed by the network controller 10. Further, the network controller 10 performs moving instruction and the like with respect to the optical transmitting/receiving devices, the ROADM devices, the optical amplifiers, and the like. It is assumed that the network controller 10 holds information of usage situation of a current wavelength, information representing where a guard band exists, and the like.

Figure 6:
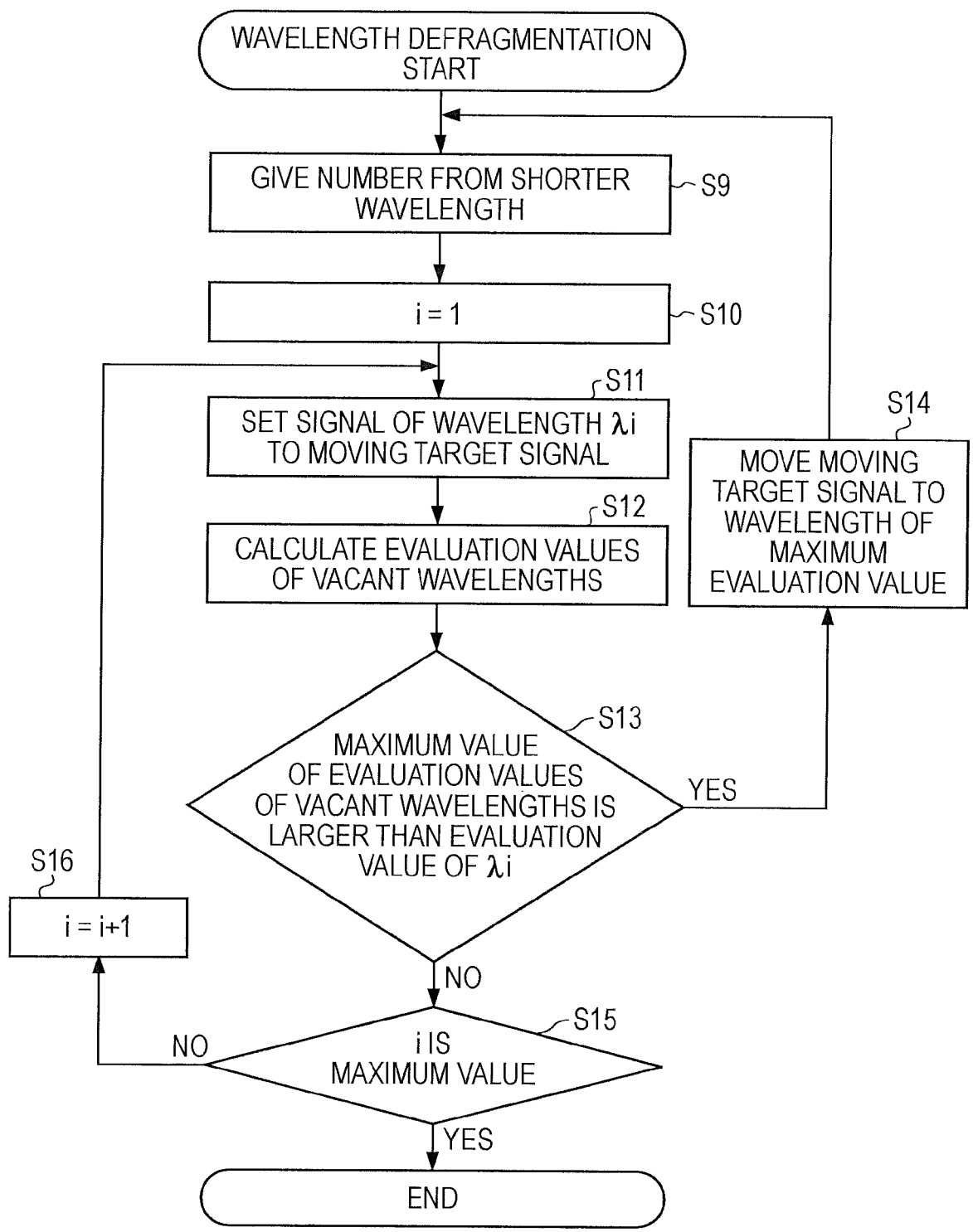
FIG. 6 illustrates the flow of the operation of the wavelength defragmentation (II)

FIG. 6 is a flowchart of algorithm of the wavelength defragmentation. When the wavelength defragmentation is started, a parameter i which manages a moving target signal is set to a default value (i=1) (operation S10). In operation S11, a signal of a wavelength λi is set to the moving target signal. In operation S12, evaluation values of respective vacant wavelengths are calculated. In operation S13, whether the maximum value of the evaluation values of the vacant wavelengths is larger than an evaluation value of the current wavelength of the moving target signal is determined. When the maximum value of the evaluation values of the vacant wavelengths is larger than the evaluation value of the current wavelength of the moving target signal, the moving target signal is moved to a wavelength on which the evaluation value is maximum (operation S14). After the movement, i is returned to the default value (operation S10). When the evaluation value of the vacant wavelengths is equal to or smaller than the evaluation value of the current wavelength, whether i is the maximum value is determined in operation S15. When i does not reach the maximum value, the moving target signal is changed under the condition of i=i+1 in operation S16. When i is already the maximum value, the processing is ended. Here, each wavelength is given a number as λ1, λ2, ... from a shorter wavelength every time in operation S9.

FIG. 7 illustrates an example of calculation of an evaluation value. An evaluation value is calculated from a signal adjacent to a vacant wavelength which is a candidate of a movement destination. When the adjacent signal has the same modulation method as that of the moving target signal, the evaluation value is set to 1. At this time, in a case where there is a plurality of adjacent signals of the same modulation method, the number of the signals is set to the evaluation value. When two signals of the same modulation method are adjacent, the evaluation value is set to 2, and when four signals of the same modulation method are adjacent, the evaluation value is set to 4 (as illustrated in FIG. 7). When the adjacent signal is a modulation signal of a different modulation method or there are no adjacent signals, the evaluation value is set to 0. In terms of the moving target signal, when signals of the same modulation method as that of the moving target signal are adjacent, the number of the wavelengths is set to the evaluation value. When there are no adjacent signals of the same modulation method, the evaluation value is set to 0.

Figure 8:
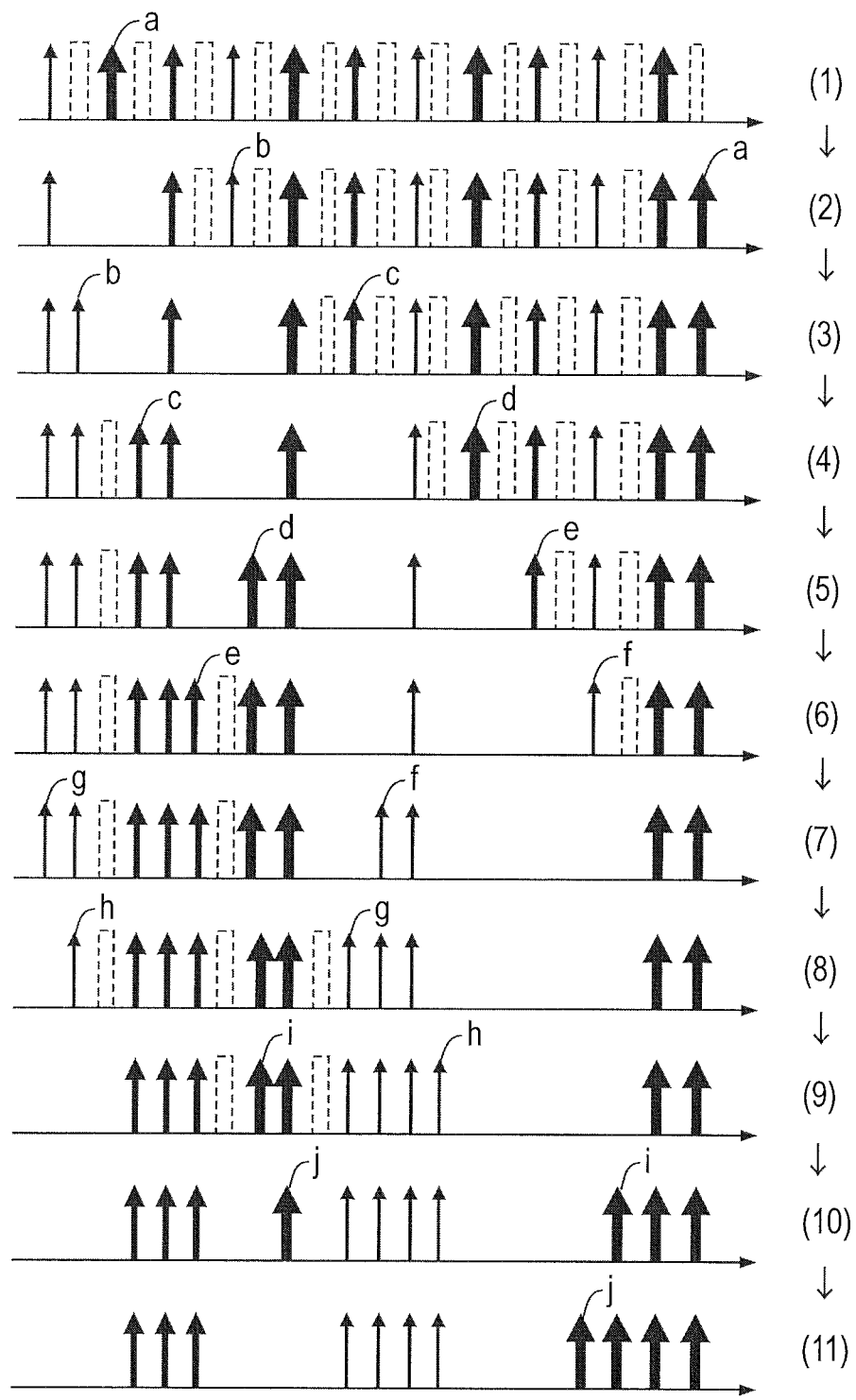
FIG. 8 illustrates the flow of the operation of the wavelength defragmentation (IV)

Referring to FIG. 8, an operation of the wavelength defragmentation in a case the algorithm of FIG. 6 is employed is described. An optical signal a of part (1) is moved to a next position of an optical signal depicted by a thick arrow as illustrated in part (2). An optical signal b of part (2) is moved to a next position of an optical signal depicted by a thin arrow as illustrated in part (3). An optical signal c of part (3) is moved to a next position of an optical signal depicted by an intermediate thick arrow as illustrated in part (4). An optical signal d of part (4) is moved to a next position of a left-side optical signal beam depicted by a thick arrow as illustrated in part (5). An optical signal e of part (5) is moved to a next position of a left-side group of optical signals depicted by intermediate thick arrows as illustrated in part (6). An optical signal f of part (6) is moved to a next position of a middle optical signal beam depicted by a thin arrow as illustrated in part (7). An optical signal g of part (7) is moved to a next position of a middle group of optical signals depicted by thin arrows as illustrated in part (8). An optical signal h of part (8) is moved to a next position of a middle group of optical signals depicted by thin arrows as illustrated in part (9). An optical signal i of part (9) is moved to a next position of a right-side group of optical signals depicted by thick arrows as illustrated in part (10). An optical signal j of part (10) is moved to a next position of a right-side group of optical signals depicted by thick arrows as illustrated in part (11).

Figure 9:
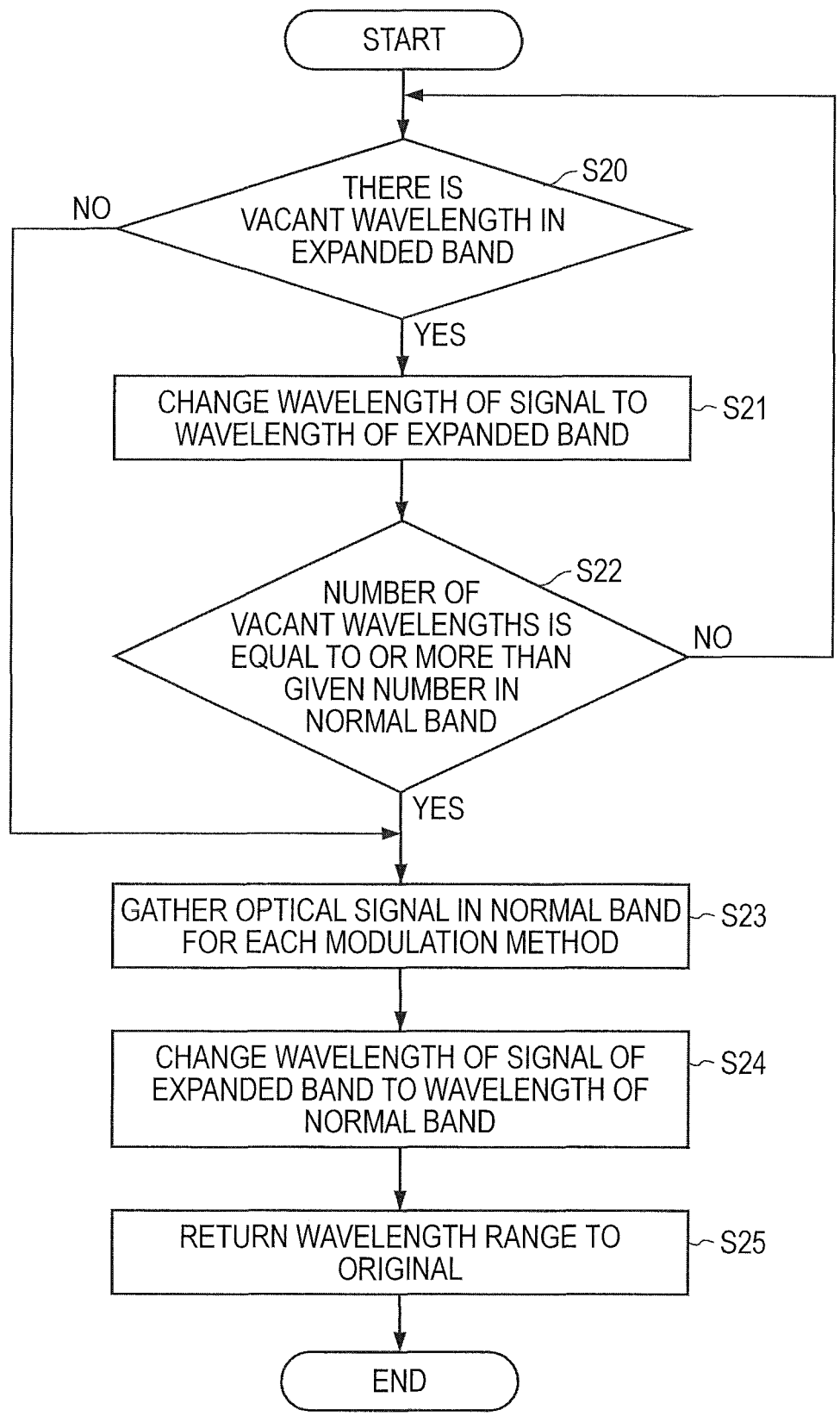
FIG. 9 illustrates a flow of the operation of the wavelength defragmentation (V)
Figure 10:
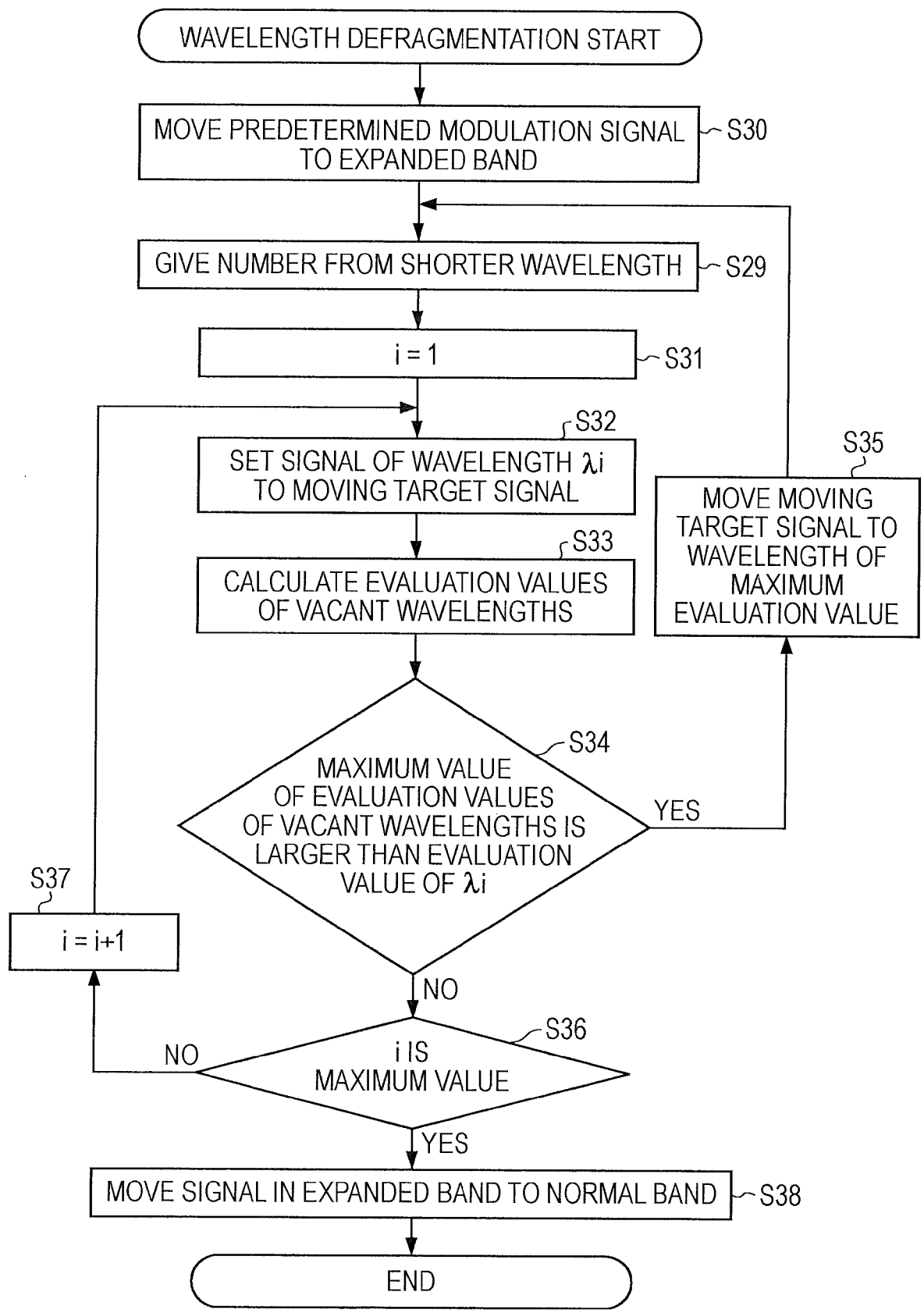
FIG. 10 illustrates a flow of the operation of the wavelength defragmentation (VI)
Figure 11:
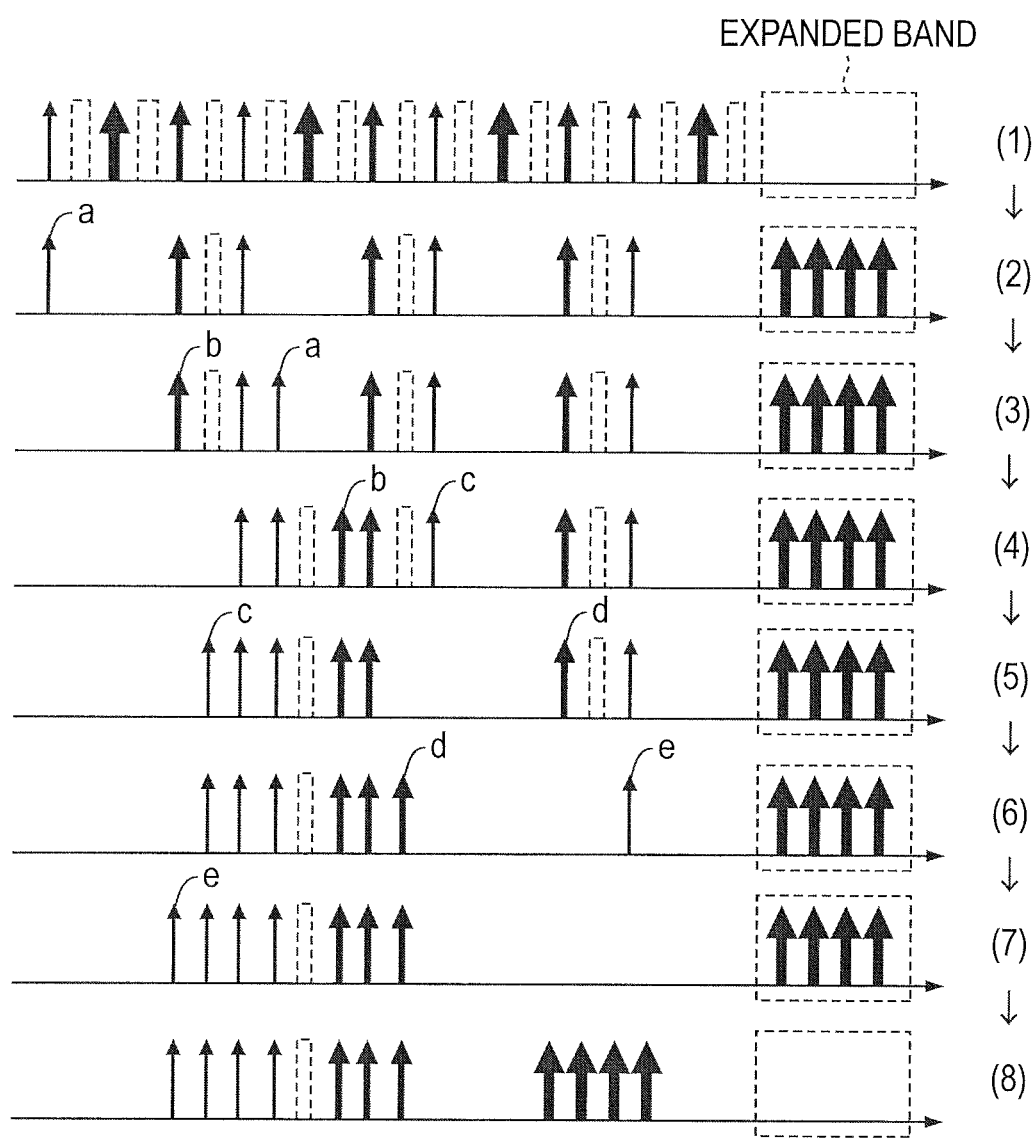
FIG. 11 illustrates a flow of the operation of the wavelength defragmentation (VII)

FIGS. 9 to 11 illustrate the wavelength defragmentation in a case where the expanding band is performed.

FIG. 9 is a schematic flowchart for performing the wavelength defragmentation with the performance of the expanding band. When the processing is started, whether there is a vacant wavelength in the expanded band is determined in operation S20. When the determination of operation S20 is No, the process goes to operation S23. When the determination of operation S20 is Yes, a wavelength of a signal is changed to a wavelength of the expanded band in operation S21 and whether the number of vacant wavelengths in a signal band (normal band) before the expanding band is equal to or more than a given number is determined in operation S22. The given number here is arbitrarily set by a system designer. When the determination in operation S22 is No, the process returns to operation S20. When the determination in operation S22 is Yes, wavelengths are changed so that optical signals of the same modulation method in the normal band are gathered for each modulation method in operation S23 and the wavelengths of signals in the wavelength range are changed to wavelengths of the normal band in operation S24 after the completion of the gathering. Then, the expanded band is returned to the original in operation S25, and the processing is ended.

FIG. 10 is a flowchart illustrating algorithm of the wavelength defragmentation in a case where the expanding band is performed. In a case where the expanding band is performed, a signal of a predetermined modulation method (for example, a signal depicted by the thickest arrow in FIG. 11) is moved to the expanded band immediately after the wavelength defragmentation is started. Subsequently, movement of a wavelength is performed through operations similar to FIGS. 6 and 7, and a signal in the expanded band is moved to a normal band after the completion of the processing.

When the wavelength defragmentation is started, optical signals of a predetermined modulation method are moved to the expanded band in operation S30. In operation S31, i is initialized to 1. In operation S32, a signal of wavelength λi is set to a moving target. In operation S33, evaluation values of vacant wavelengths are calculated. In operation S34, whether the maximum value of the evaluation values of the vacant wavelengths is larger than an evaluation value of the signal of wavelength λi is determined. When the determination of operation S34 is Yes, the moving target signal is moved to a wavelength of the maximum evaluation value in operation S35 and the process returns to operation S31.

When the determination of operation S34 is No, whether i is the maximum value is determined in operation S36. This maximum value is the number of wavelengths which are kept without being moved and are given the numbers in operation S29. When the determination of operation S36 is No, i=i+1 is set and the process returns to operation S32. When the determination of operation S36 is Yes, the signals in the expanded band are moved to the normal band in operation S38, and the processing is ended.

Here, each wavelength is given a number as λ1, λ2, . . . from a shorter wavelength every time in operation S29. Further, before the start and after the end of the processing of FIG. 10, bands of the optical amplifiers are expanded and are returned to the normal band respectively.

Referring to FIG. 11, the operation of the wavelength defragmentation in a case where the algorithm of FIG. 10 is employed is described. In part (1), optical signals of each wavelength are fragmented. In part (2), all optical signals depicted by thick arrows are moved to the expanded band. Then, an optical signal a of part (2) is moved to a next position of a left-side optical signal beam depicted by a thin arrow in part (3). An optical signal b of part (3) is moved to a next position of middle optical signal beam depicted by an intermediate thick arrow in part (4). An optical signal c of part (4) is moved to a next position of a left-side group of optical signals depicted by thin arrows in part (5). An optical signal d of part (5) is moved to a next position of a group of optical signals depicted by intermediate thick arrows in part (6). An optical signal e of part (6) is moved to a next position of a group of optical signals depicted by thin arrows in part (7). Then, the optical signals which are depicted by thick arrows and have been put in the expanded band are moved into the normal band in part (8).

Figure 12:
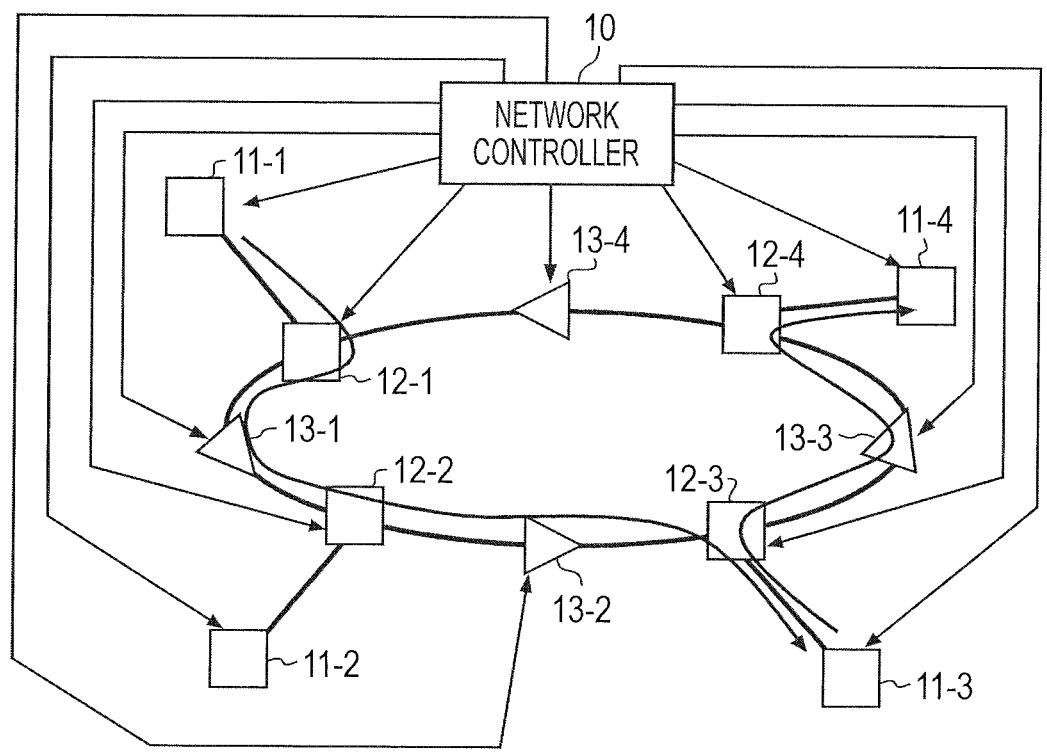
FIG. 12 illustrates the first configuration of the embodiment (I)
Figure 13:
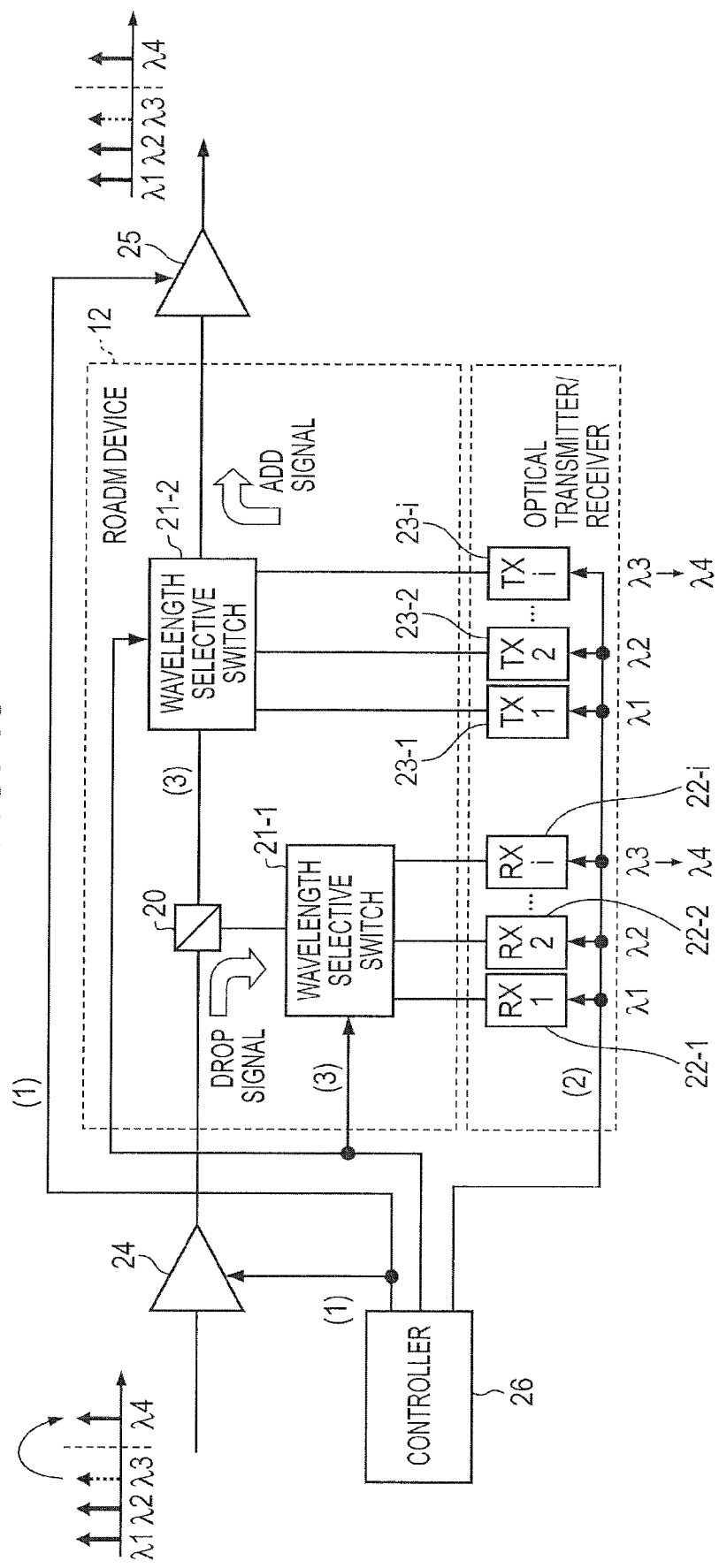
FIG. 13 illustrates the first configuration of the embodiment (II)
Figure 14:
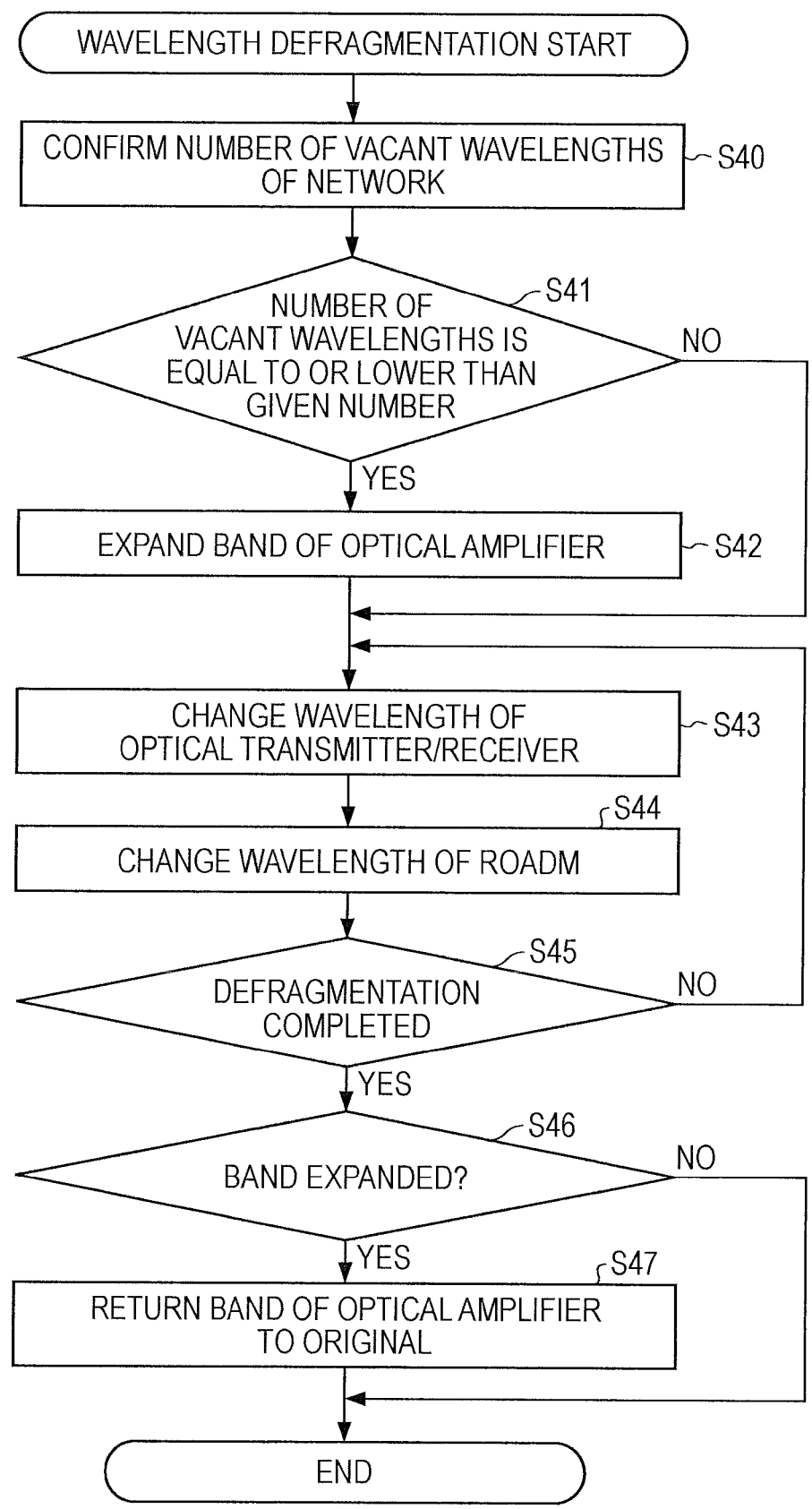
FIG. 14 illustrates the first configuration of the embodiment (III)

FIGS. 12 to 14 illustrate the first configuration of the optical network according to the embodiment. FIG. 12 illustrates the configuration of the optical network. The optical network system includes the optical transmitting/receiving devices 11-1 to 11-4 for wavelength multiplexing communication, the optical amplifiers 13-1 to 13-4 for wavelength multiplexing communication, the ROADM devices 12-1 to 12-4, and the network controller 10. The network controller 10 manages a wavelength used in the optical network system, the way of setting a path, a vacant wavelength, a modulation method and a modulation rate of each path, and the like. When a path is re-built and a wavelength is switched, for example, the network controller 10 gives operation instruction to control the optical transmitting/receiving devices 11-1 to 11-4 for wavelength multiplexing communication, the optical amplifiers 13-1 to 13-4 for wavelength multiplexing communication and the ROADM devices 12-1 to 12-4.

FIG. 13 illustrates the configuration of the ROADM device. The ROADM device 12 is composed of a coupler 20 and wavelength selective switches (WSS) 21-1 and 21-2. A wavelength division multiplexing (WDM) signal inputted into the ROADM device 12 is split as a drop signal by the coupler 20. The drop signal is inputted into the WSS 21-1 and split for every wavelength so as to be inputted into a corresponding optical receiver (RX) 22-1, 22-2, . . . , or 22-i of the optical transmitting/receiving device. On the other hand, each add signal outputted from the optical transmitter (TX) 23-1, 23-2, . . . , or 23-i is inputted into the WSS 21-2 and combined with the WDM signal which passes through the coupler 20 so as to be outputted from the ROADM device 12.

Optical amplifiers 24 and 25 for wavelength multiplexing communication are respectively provided on a former stage and a subsequent stage of the ROADM device 12 and amplify the WDM signal. The optical amplifier 24 on the former stage operates as a post-amplifier and the optical amplifier 25 on the subsequent stage operates as a pre-amplifier. A controller 26 (1) expands wavelength bands of the optical amplifiers 24 and 25, (2) changes wavelengths of the optical transmitters 22-1 to 22-i and the optical receivers 23-1 to 23-i, and (3) changes selection wavelengths of the WSS 21-1 and 21-2.

FIG. 14 illustrates an example of a flowchart of an operation of the optical network system. When the wavelength defragmentation is started, the number of vacant wavelengths of the optical network system is confirmed (operation S40). In operation S41, whether the number of vacant wavelengths is equal to or lower than a given number is determined. At this time, in a case where the number of vacant wavelengths is more than the given number, the wavelengths are rearranged in the normal band without performing the expanding band of the optical amplifiers. On the other hand, in a case where the number of vacant wavelengths is equal to or lower than the given number, the bands of the optical amplifiers are expanded (operation S42) and the process goes to operation S43 so as to perform rearrangement of wavelengths. Here, it is assumed that the network controller 10 holds information of vacant wavelengths.

In the rearrangement of wavelengths, after the wavelength of the optical transmitting/receiving device is changed (operation S43), the wavelength of the ROADM device is changed (operation S44). The rearrangement of wavelengths (wavelength defragmentation) is repeated until optical signals of the same modulation method become adjacent to each other for every modulation method (in a case where the determination of operation S45 becomes No). When the rearrangement of wavelengths is completed (in a case where the determination of operation S45 is Yes), whether the expanding band has been performed is determined in operation S46. When it is determined that the expanding band is not performed in operation S46, the processing is ended, and when it is determined that the expanding band is performed, the bands of the optical amplifiers are returned to the normal state in operation S47 and the operation of the wavelength defragmentation is completed.

The wavelength defragmentation may be performed when the number of guard bands exceeds a given number or may be performed regularly such as once a day or once a month, for example.

FIGS. 15 to 19 illustrate configuration examples of an optical amplifier for wavelength multiplexing communication which is used in the optical network system of the embodiment.

Figure 15:
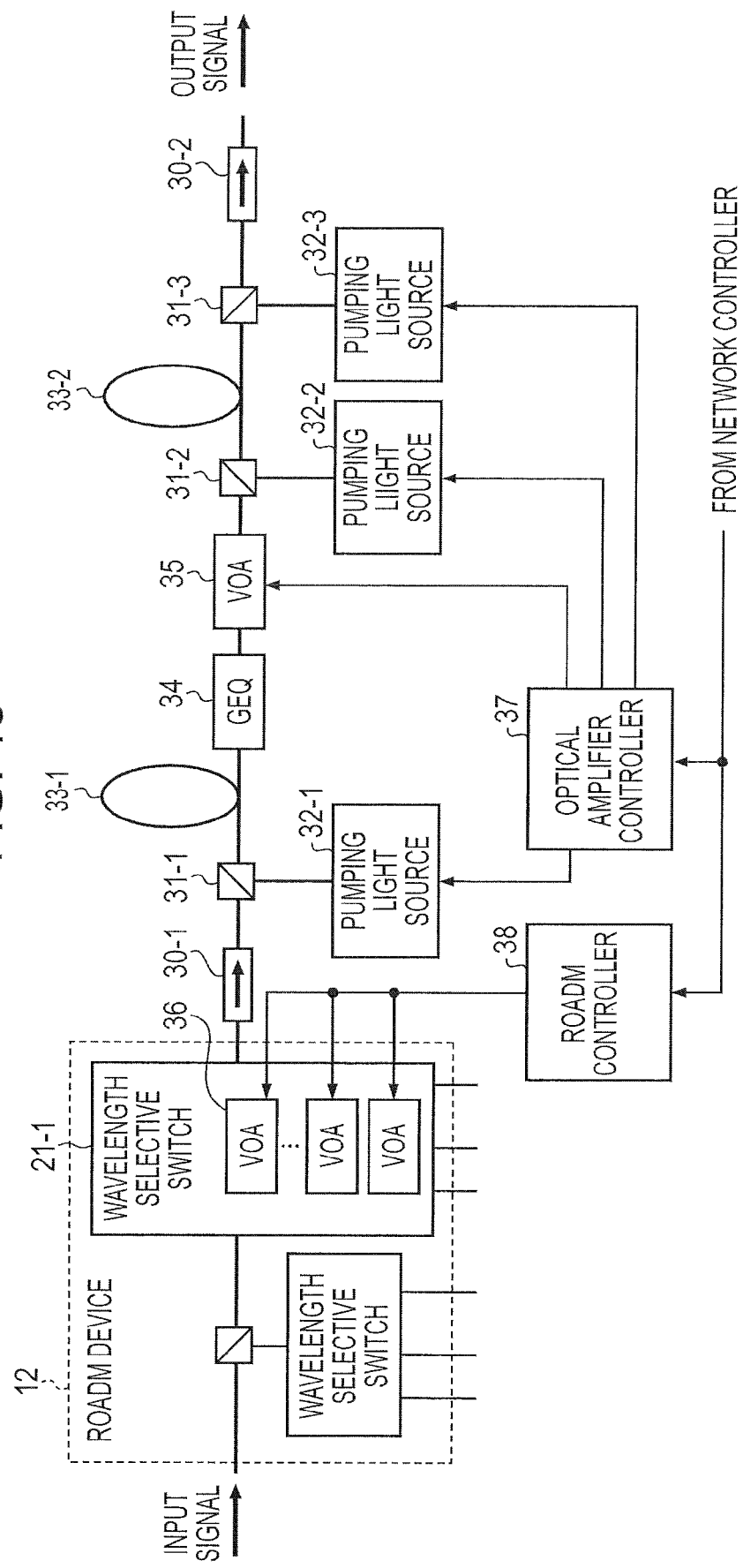
FIG. 15 illustrates a configuration example of an optical amplifier for wavelength multiplexing communication which is used in an optical network system of the embodiment (I)
Figure 16:
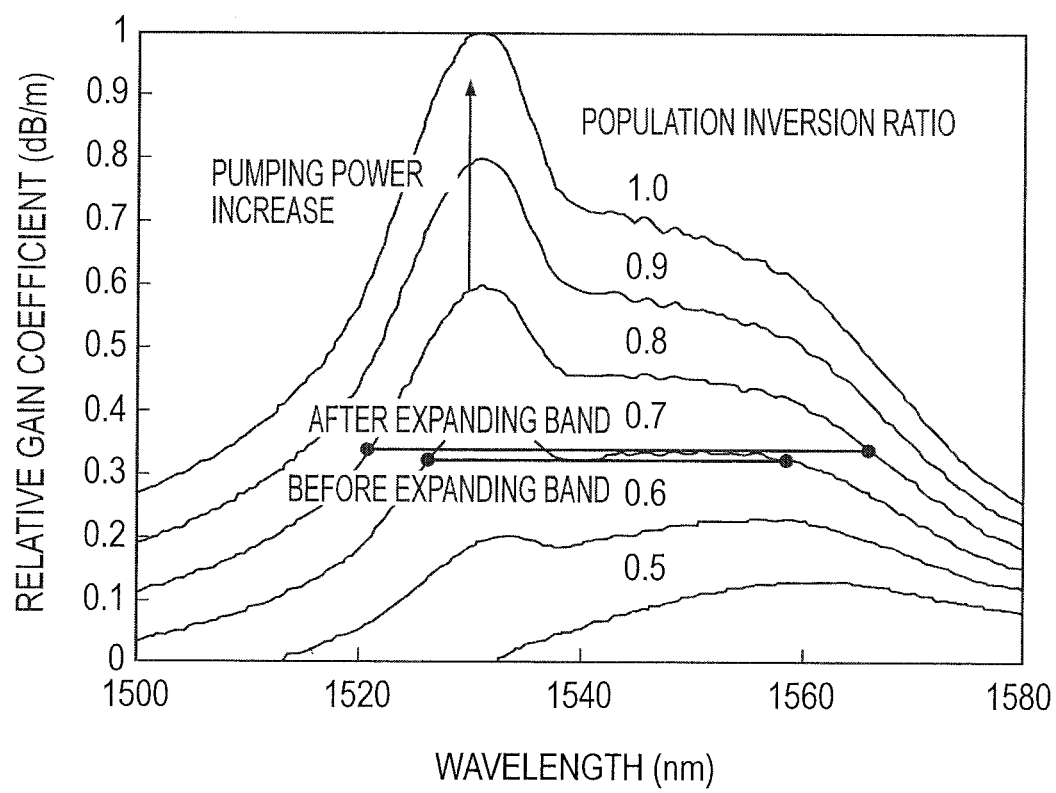
FIG. 16 illustrates the configuration example of an optical amplifier for wavelength multiplexing communication which is used in the optical network system of the embodiment (II)

FIGS. 15 and 16 illustrate a first configuration example of the optical amplifier. As depicted in FIG. 15, an erbium doped fiber amplifier (EDFA) is commonly used as the optical amplifier for wavelength multiplexing communication. The EDFA includes optical isolators 30-1 and 30-2, pumping optical couplers 31-1, 31-2, and 31-3, pumping light sources 32-1, 32-2, and 32-3, erbium doped fibers (EDF) 33-1 and 33-2, a gain equalizer (GEQ) 34, and a variable optical attenuator (VOA) 35. Pumping light of the pumping light source 32-1 is inputted into the EDF 33-1 and is used for amplification of optical signal. The optical signal amplified in the EDF 33-1 is inputted into the gain equalizer 34. The gain equalizer 34 adjusts intensity of optical signal of each wavelength so as to flat gain deviation of the EDF 33-1. The VOA 35 adjusts attenuation quantity when the intensity of the inputted signal is changed and thus keeps the gain of whole of the optical amplifier steady so as to keep the gain deviation of the optical amplifier flat. Pumping light from the pumping light sources 32-2 and 32-3 is inputted into the EDF 33-2 and the optical signal from the VOA 35 is amplified. The optical signal amplified in the EDF 33-2 is outputted as an output signal.

A wavelength property of a gain of the EDFs 33-1 and 33-2 is determined by an operation point (population inversion ratio) which is determined by pumping power outputted from the pumping power source. This wavelength property of the gain is illustrated in FIG. 16. In FIG. 16, a horizontal axis represents a wavelength and a vertical axis represents a relative gain coefficient.

As illustrated in FIG. 16, when pumping power is increased, an operation point increases and a gain wavelength band expands. In FIG. 16, it is assumed that the population inversion ratio is 0.7 before the expanding band and the population inversion ratio becomes 0.8 after the expanding band.

At this time, though the gain wavelength property is flat in the normal operation, deviation of the gain wavelength property is generated by changing the operation point. The deviation of the gain wavelength property is flatted by controlling VOAs 36 for respective optical signal which are included in the WSS 21-2 of the ROADM device 12. Though power consumption of the whole system temporarily increases by increasing pumping power of the pumping light sources 32-1 to 32-3, the operation of the optical amplifier is returned to the original after the end of the wavelength defragmentation and thereby the power consumption is also returned to the normal state.

Further, deviation of the gain property is flatted by controlling the VOA 35 of the optical amplifier as well. Deviation of the gain property is flatted by controlling the attenuation quantity of the VOA 35 and adjusting the gain of the whole of the optical amplifier. The VOA 35 is controlled by an optical amplifier controller 37 which controls the optical amplifier. The optical amplifier controller 37 controls output power of the pumping light sources 32-1 to 32-3 as well. That is, the optical amplifier controller 37 increases output power of the pumping light sources 32-1 to 32-3 in a case where expanding band is performed and the optical amplifier controller 37 returns the output power to the original output power in a case where the band is returned to the normal band.

The attenuation quantity of the VOA 36 in the WSS 21-2 of the ROADM device 12 is controlled by a ROADM controller 38. The ROADM controller 38 and the controller 26 of FIG. 13 function in the same fashion. The ROADM controller 38 and the optical amplifier controller 37 perform control operations in response to instructions of the network controller 10 which manages the whole network.

Figure 17:
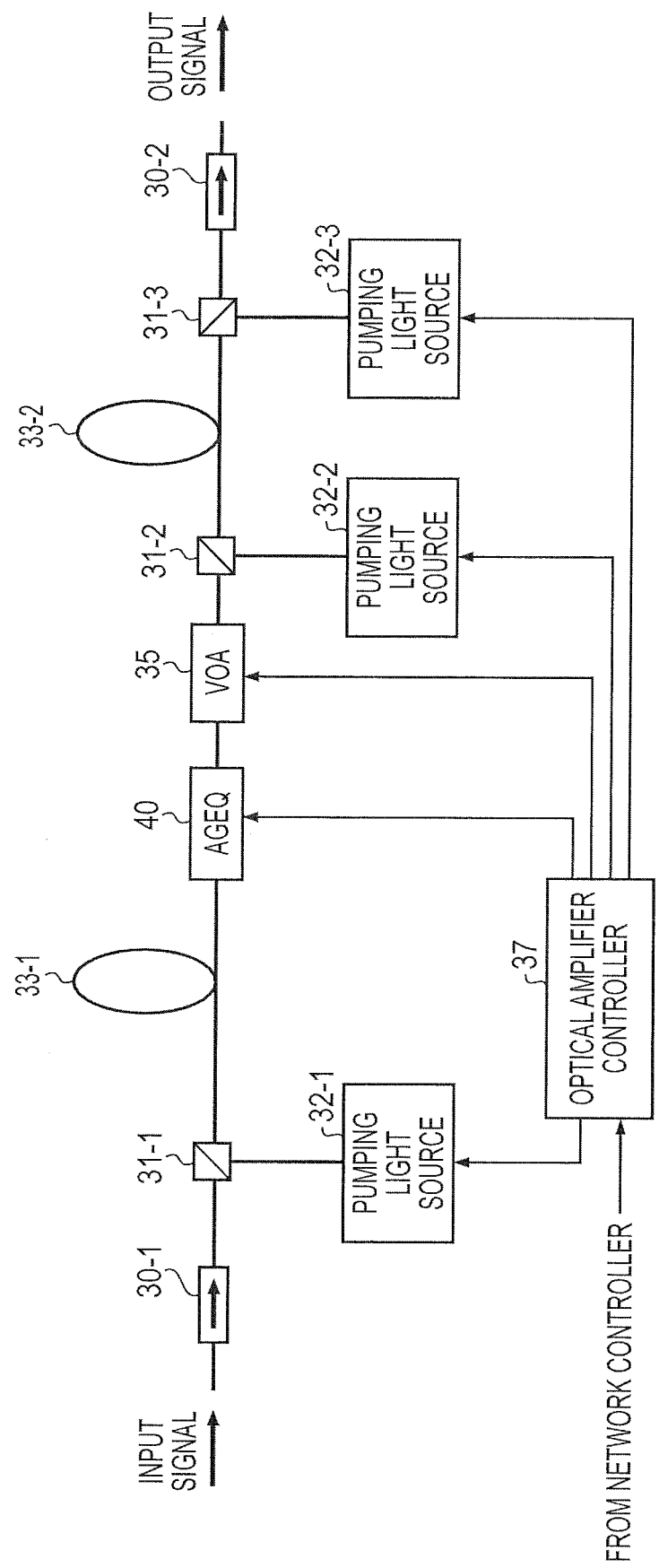
FIG. 17 illustrates the configuration example of an optical amplifier for wavelength multiplexing communication which is used in the optical network system of the embodiment (III)
Figure 18:
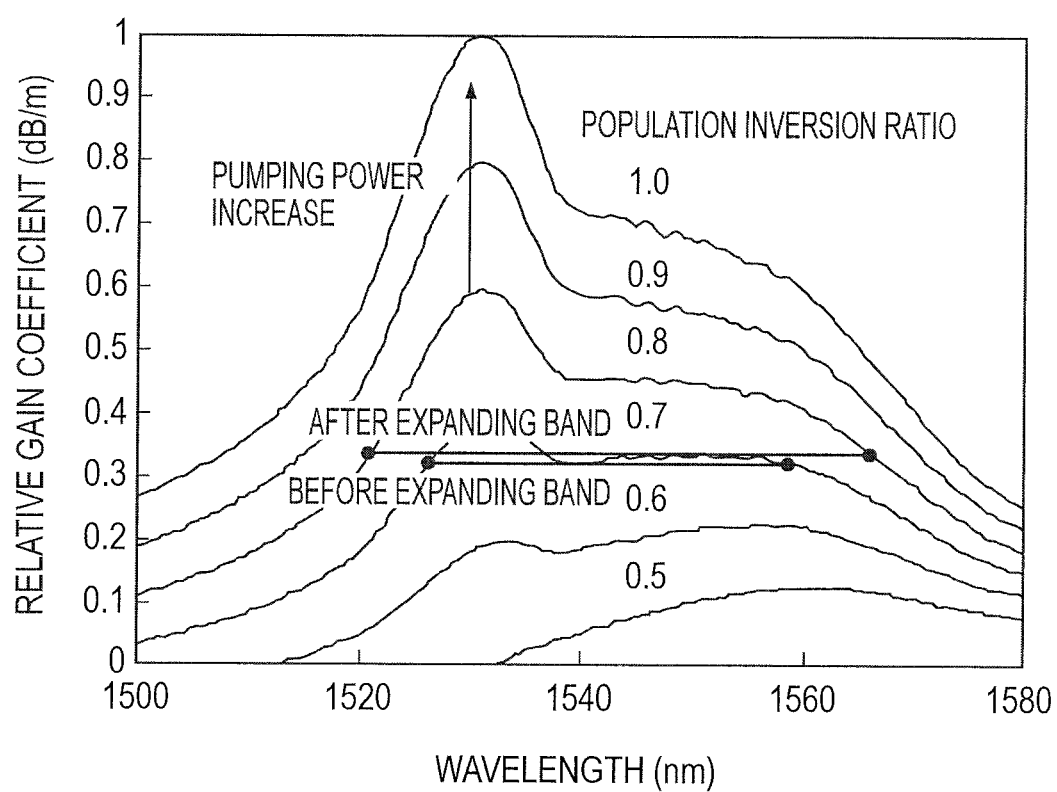
FIG. 18 illustrates the configuration example of an optical amplifier for wavelength multiplexing communication which is used in the optical network system of the embodiment (IV)

FIGS. 17 and 18 illustrate a second configuration example of an optical amplifier. In FIG. 17, elements same as those in FIG. 15 are given the same reference numerals and the description thereof is omitted.

In FIGS. 17 and 18, an operation point of an EDFA is increased so as to expand a gain wavelength band as is the same with FIGS. 15 and 16. Deviation of the gain wavelength property generated at this time is compensated by an active gain equalizer (AGEQ) 40 so as to flat the gain wavelength property.

In the expanding band, output power of the pumping light sources 32-1 to 32-3 is increased so as to increase the population inversion ratio of the EDFs 33-1 and 33-2 larger than the normal state. FIG. 18 illustrates a gain property of the EDFs 33-1 and 33-2. FIG. 18 illustrates a gain property for each population inversion ratio as is the case with FIG. 16. A horizontal axis of FIG. 18 represents a wavelength and a vertical axis represents a relative gain coefficient. It is assumed that the population inversion ratio is approximately 0.7 before the expanding band and the population inversion ratio is approximately 0.8 after the expanding band. When the population inversion ratio is 0.8, the gain is higher than that in a case of the population inversion ratio of 0.7 and a band available for signal amplification is expanded, but gain deviation is increased. Accordingly, the gain deviation is flatted by the AGEQ 40 so as to maintain a transmission property of optical signal. Of course, attenuation quantity of the VOA 35 may be simultaneously controlled. Though operation efficiency is degraded due to the increase of the output power of the pumping light source in the expanding band, the band is returned to the normal band after the end of the wavelength defragmentation and the optical network system is operated in a state of excellent operation efficiency in the normal operation.

Figure 19:
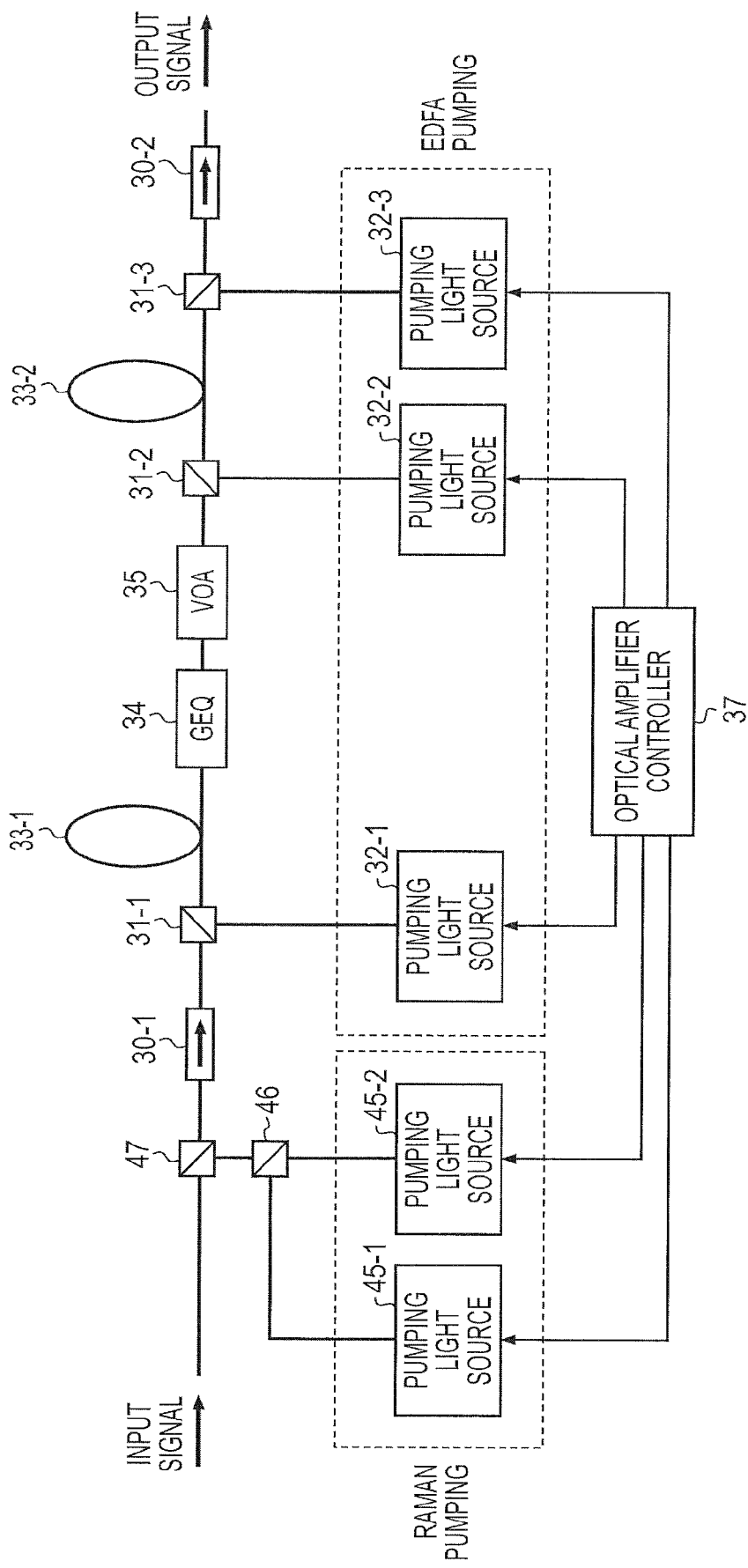
FIG. 19 illustrates the configuration example of an optical amplifier for wavelength multiplexing communication which is used in the optical network system of the embodiment (V)

FIG. 19 illustrates a third configuration example of an optical amplifier. In FIG. 19, elements same as those in FIG. 15 are given the same reference numerals and the description thereof is omitted.

FIG. 19 illustrates an example that a post amplifier which is on a former stage of the optical amplifier is composed of a combination of an EDFA and a distributed Raman amplifier (DRA). The DRA inputs pumping light from Raman pumping light sources 45-1 and 45-2 into a transmission path and uses a generated Raman gain for amplification. The pumping light from the Raman pumping light sources 45-1 and 45-2 are multiplexed in a coupler 46 and introduced to the transmission path via a coupler 47. Generally, a band of one pumping light beam is not sufficient in the Raman amplification, so that a plurality of pumping light beams of different wavelengths is commonly used in the Raman amplification. In this example, it is set that two pumping light beams of different wavelengths are used. For example, it is set that the pumping light source 45-1 is used to amplify a short wavelength side and the pumping light source 45-2 is used to amplify a long wavelength side. At this time, a gain wavelength property of a Raman gain is determined by a combination of wavelengths and power of the Raman pumping light sources 45-1 and 45-2. In the configuration of FIG. 19, deviation of the gain wavelength property which is generated by increasing the operation point of the EDFA is compensated by adjusting a power ratio of the Raman pumping light sources 45-1 and 45-2. For example, it is assumed that the population inversion ratio of the EDFs 33-1 and 33-2 is increased due to an expanding band operation. Apparent from FIGS. 16 and 18, when the population inversion ratio is increased, a gain is increased in the EDFAs, but increase of the gain at the short wavelength side is large and increase of the gain at the long wavelength side is small. Accordingly, it is desirable that the gain at the long wavelength side is made larger so as to attain a flat gain property in the whole amplification band. In this case, when Raman amplification is performed, output power of pumping light of the pumping light source 45-2 which is used for amplification of the long wavelength side is made larger than output power of pumping light of the pumping light source 45-1 which is used for amplification of the short wavelength side. Accordingly, optical signal at the long wavelength side is further amplified by the Raman amplification and a total gain property of the Raman amplifiers and the EDFAs becomes flatter.

Second Embodiment

FIGS. 20 to 23 illustrate the configuration of a second embodiment. Wavelengths have to be switched in wavelength rearrangement in the configuration of the above-described first embodiment, so that signal disconnection occurs.

Figure 20:
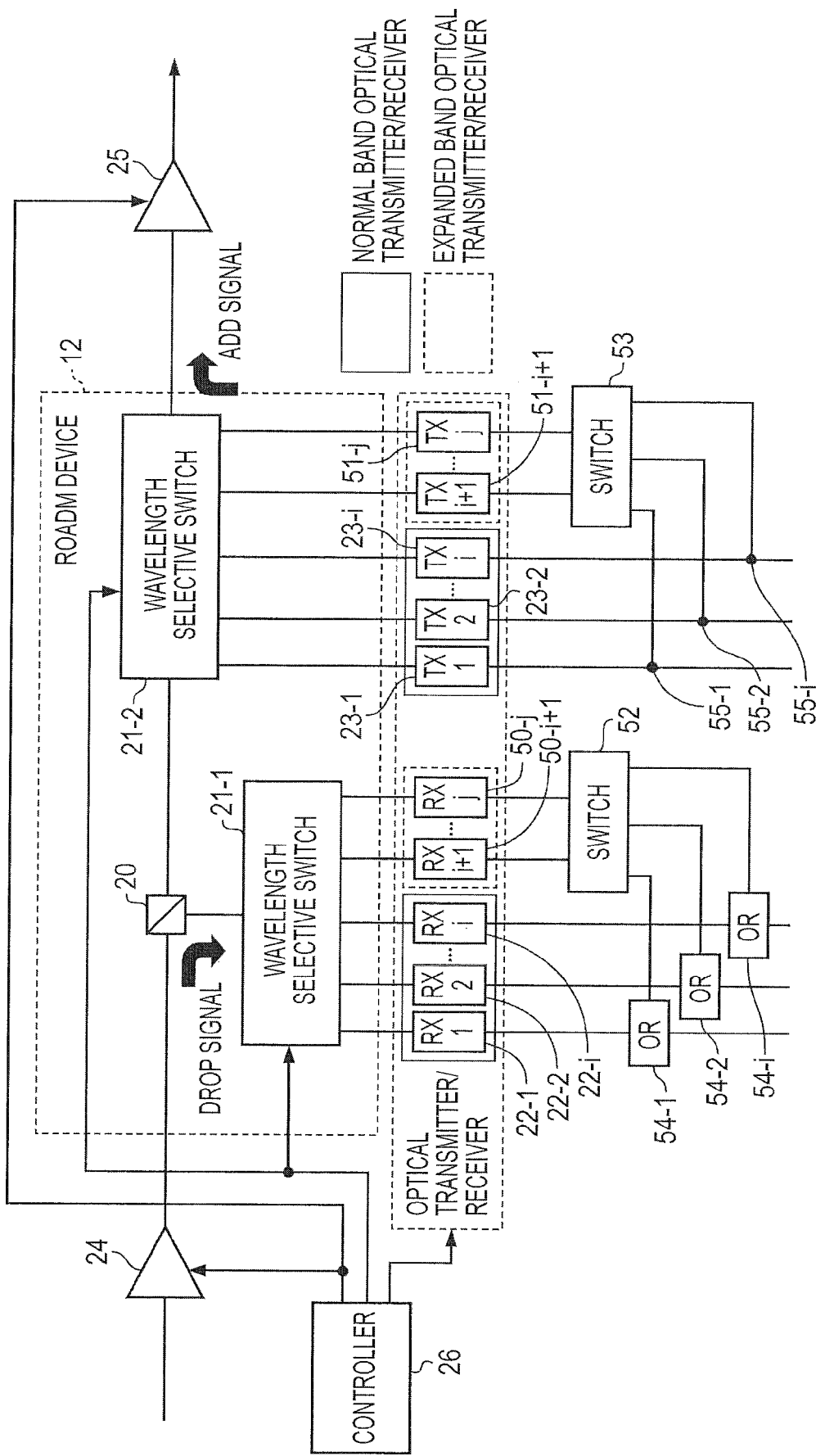
FIG. 20 illustrates the second configuration of the embodiment (I)

FIG. 20 illustrates the configuration of a ROADM device which can rearrange wavelengths without generating signal disconnection in an operation. In FIG. 20, elements same as those of FIG. 13 are given the same reference characters and the description thereof is omitted.

In the configuration of the second embodiment, in addition to the configuration of the first embodiment, optical receivers 50-$i$+1 to 50-$j$, optical transmitters 51-$i$+1 to 51-$j$, data switches 52 and 53, OR circuits 54-1 to 54-$i$, and branch circuits 55-1 to 55-$i$ are provided, for the expanding band.

Figure 21:
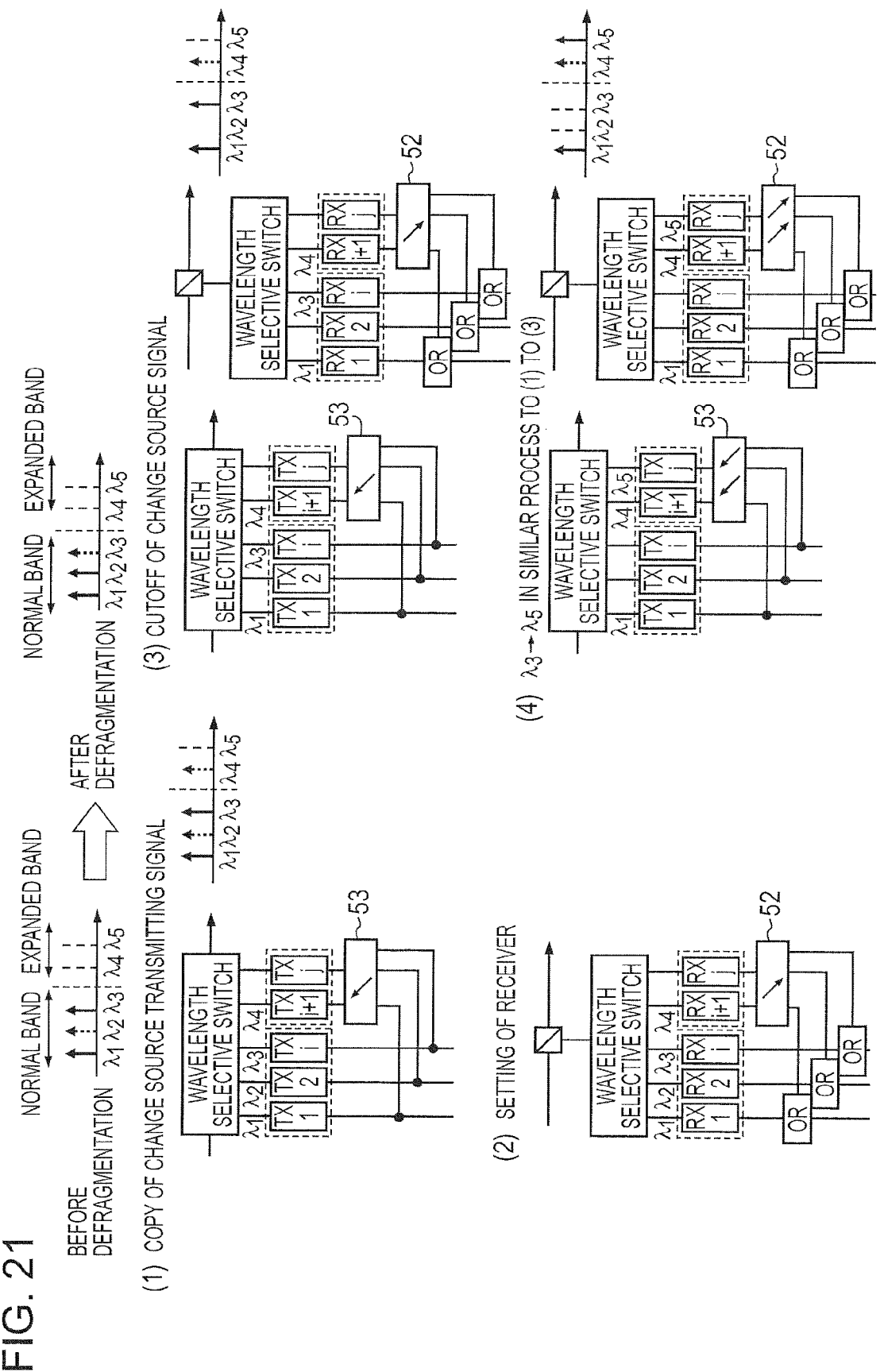
FIG. 21 illustrates the second configuration of the embodiment (II)

FIGS. 21 and 22 illustrate an operation example. Here, it is assumed that there are three optical signals of $\lambda 1$ to $\lambda 3$ in the normal band and optical signals of two wavelengths can be stored in the expanded band. First, it is considered that a signal of $\lambda 2$ is arranged on $\lambda 4$. In part (1), the switch 53 of the optical transmitter is switched so as to copy a transmission data signal, which is inputted into $\lambda 2$, to $\lambda 4$. At this point, the same data signal flows in $\lambda 2$ and $\lambda 4$. Subsequently, in part (2), the switch 52 of the optical receiver is switched so as to obtain theoretical sum of outputs of $\lambda 4$ and $\lambda 2$ as a reception signal. At this point, the signal of 22 is copied to 24. Subsequently, in part (3), the optical transmitter of $\lambda 2$ and the optical receiver are respectively blocked and the rearrangement from $\lambda 2$ to $\lambda 4$ is completed. Next, in part (4), rearrangement from $\lambda 3$ to $\lambda 5$ is performed in a similar manner to the operation from parts (1) to (3). Rearrangement from $\lambda 4$ to $\lambda 3$ is performed in part (5) and rearrangement from $\lambda 5$ to $\lambda 2$ is performed in part (6). Accordingly, rearrangement of wavelengths is enabled without data disconnection.

Figure 23:
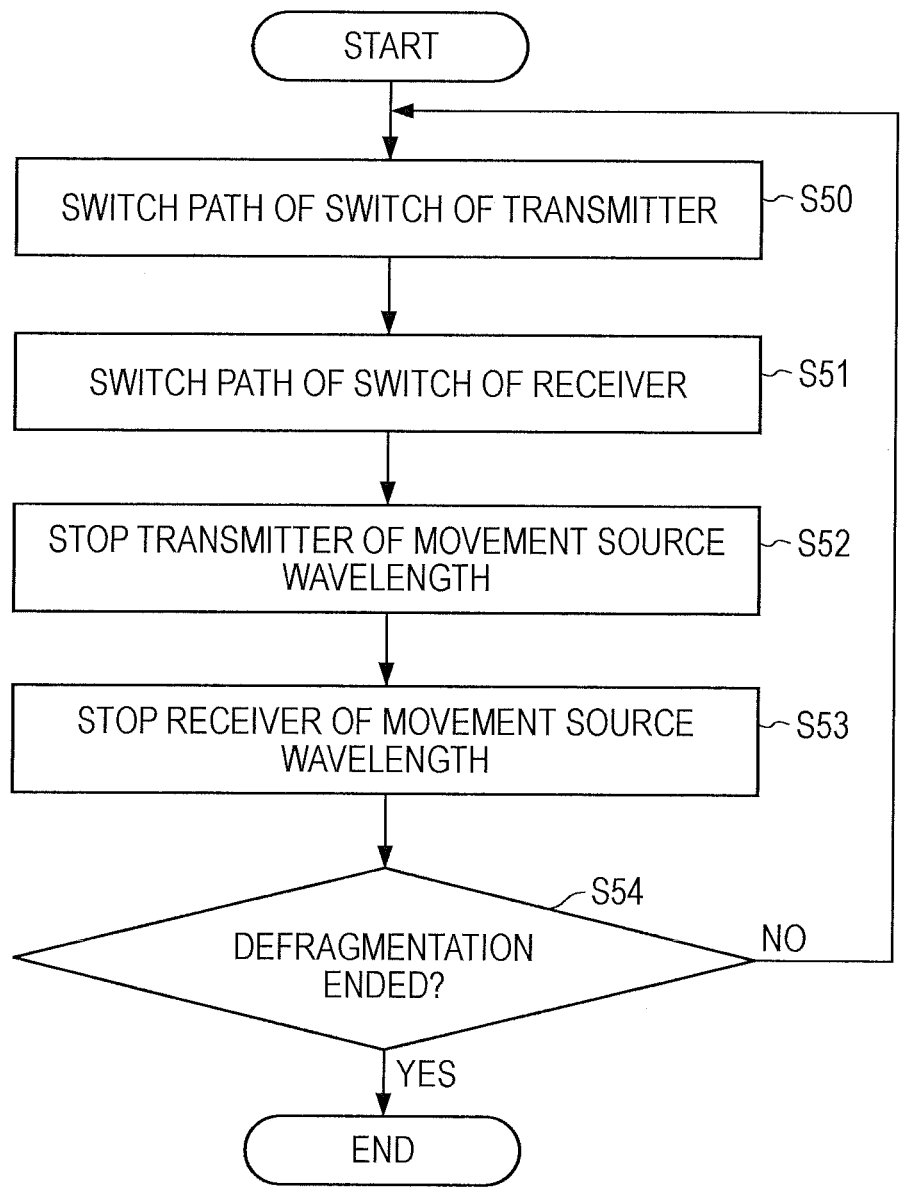
FIG. 23 illustrates the second configuration of the embodiment (IV)

FIG. 23 illustrates a processing flow for wavelength change. When the wavelength change processing is started, the switch 53 of the optical transmitter is switched in operation S50 and data of optical signal of a wavelength of a movement source is put on optical signal of a wavelength of a movement destination as well. In operation S51, the switch 52 of the optical receiver is switched so as to receive data which is put on the optical signal of the wavelength of the movement destination as well as data which is put on the optical signal of the wavelength of the movement source. The optical transmitter of the wavelength of the movement source is stopped in operation S52, and the optical receiver of the wavelength of the movement source is stopped in operation S53. Accordingly, the wavelength of the optical signal is changed from the movement source to the movement destination. In operation S54, whether the wavelength defragmentation is ended is determined. When the wavelength defragmentation is not ended, the process is returned to operation S50 and the processing is repeated. When the wavelength defragmentation is ended, the processing is ended.

Figure 24:
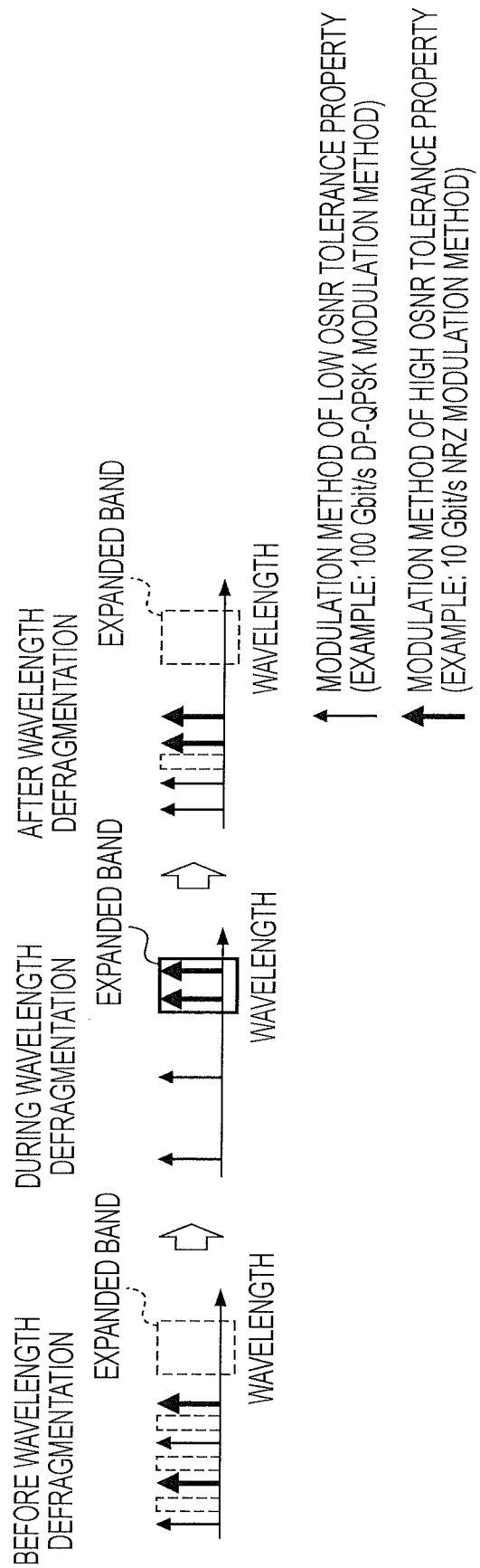
FIG. 24 illustrates an example of a wavelength moving method (I)
Figure 25:
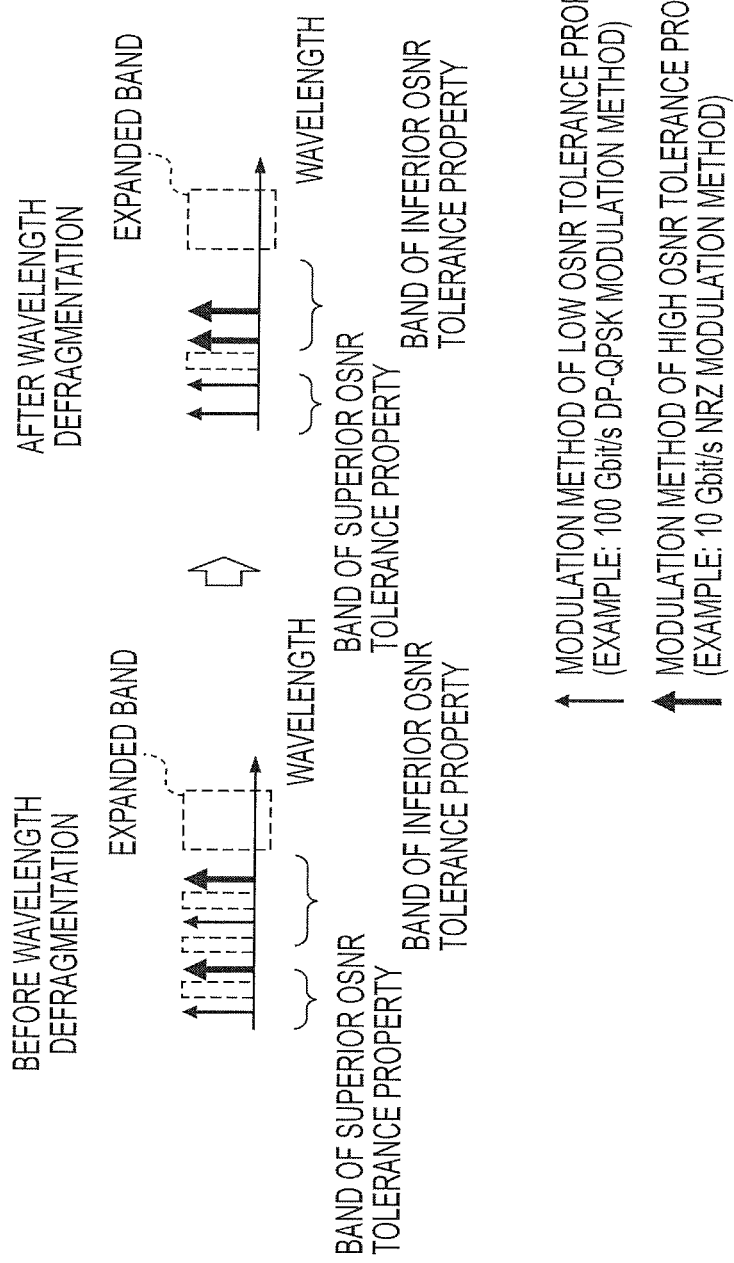
FIG. 25 illustrates an example of a wavelength moving method (II).

FIGS. 24 and 25 illustrate another example of a wavelength moving method. The network controller 10 monitors the number of guard bands, and when the number of guard bands is equal to or more than a given number, the network controller 10 performs the wavelength defragmentation, or the network controller 10 regularly performs the wavelength defragmentation.

Then, as illustrated in FIG. 24, the network controller 10 preferentially rearranges optical signal of a modulation method of which an OSNR tolerance property in the expanding band (for example, 10 Gbit/s NRZ modulation method) is superior, in a band which is expanded. That is, the expanded band is not normally used in the expanding band and the expanded band is a band in which the population inversion ratio of the EDF of the optical amplifier is not optimum. Accordingly, much noise is put on optical signal in such expanded band. Optical signal of a high speed modulation method such as optical signal of 100 Gbit/s DP-QPSK modulation method has a low OSNR tolerance property. Therefore, if such optical signal is moved to the expanded band in the wavelength defragmentation, the OSNR is degraded and a transmittable distance becomes short. Accordingly, a signal of a modulation method of which an OSNR tolerance property is high is preferentially moved to the expanded band in the wavelength defragmentation. Signals of a modulation method of which the OSNR tolerance property is low are rearranged in the normal band.

As illustrated in FIG. 25, optical signals of a modulation method of which the OSNR tolerance property is low are gathered in a wavelength band of which the OSNR tolerance property is superior and optical signals of a modulation method of which the OSNR tolerance property is high are gathered to a band of which the OSNR tolerance property is relatively inferior, in the rearrangement by the wavelength defragmentation.

The network controller 10 preliminarily holds information that which optical signal's modulation method's OSNR tolerance property is high or low and information of a wavelength band of which the OSNR tolerance property is superior, and the network controller 10 performs rearrangement of wavelengths by using the information in performing the wavelength defragmentation.

The network controller 10, the controller 26, the optical amplifier controller 37 and ROADM controller 38 may include a memory which stores a program and data and a processor which executes the program, and part of the function of the optical network system described above may be realized by software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical network system in which optical signals modulated by each of at least two modulation methods are wavelength-division-multiplexed and transferred, the optical network system comprising:
    an optical transmitter configured to transmit first optical signals modulated by each of at least two modulation methods;
    an add-drop multiplexer configured to drop second optical signals from wavelength-division-multiplexed optical signals transferred in the optical network system, and add the first optical signals to the wavelength-division-multiplexed optical signals;
    an optical receiver configured to demodulate the second optical signals corresponding to each of at least two modulation methods; and
    a controller configured to control wavelengths of the first optical signals, the second optical signals and the wavelength-division-multiplexed optical signals so as to rearrange wavelengths of the first optical signals, the second optical signals and the wavelength-division-multiplexed optical signals so that optical signals modulated by a same modulation method are placed on an adjacent wavelength.

2. The optical network system according to claim 1, further comprising:
    an optical amplifier configured to change pumping light power and amplify the wavelength-division-multiplexed optical signals, wherein
    the pumping light power is changed so as to expand an amplification band of the optical amplifier in case of the rearrangement of wavelengths.

3. The optical network system according to claim 2, wherein
    the optical amplifier includes:
       an erbium doped fiber;
       a pumping light source for the erbium doped fiber; and
       a variable attenuator, and
    the amplification band is expanded by controlling the pumping light power output from the pumping light source and attenuation quantity of the variable attenuator in case of the rearrangement of wavelengths.

4. The optical network system according to claim 2, wherein
    the optical amplifier includes:
       an erbium doped fiber;
       a pumping light source for the erbium doped fiber; and
       an active gain equalizer, and
    the amplification band is expanded by controlling the pumping light power output from the pumping light source and an equalization property of the active gain equalizer in case of the rearrangement of wavelengths.

5. The optical network system according to claim 2, wherein
    the optical amplifier includes:
       an erbium doped fiber;
       a Raman amplifier;
       a first pumping light source for the erbium doped fiber; and
       a second pumping light source for the Raman amplifier, and
    the amplification band is expanded by controlling each of the pumping light power output from the first pumping light source and the pumping light power output from the second pumping light source in case of the rearrangement of wavelengths.

6. The optical network system according to claim 2, wherein
    the optical transmitter is configured to transmit the first optical signals of a wavelength included in a band including an expanded band expanded by expanding the amplification band, and
    the optical receiver is configured to demodulate the second optical signals of the wavelength included in the band including the expanded band expanded by expanding the amplification band, corresponding to each of at least two modulation methods.

7. The optical network system according to claim 2, wherein the controller is configured to hold information representing whether an optical signal to noise ratio (OSNR) tolerance property according to a modulation method of an optical signal is higher than a predetermined value, and move an optical signal modulated a modulation method of a high OSNR tolerance property to the expanded band expanded by expanding the amplification band, in case of the rearrangement of wavelengths.

8. The optical network system according to claim 2, wherein the controller is configured to hold information representing whether an optical signal to noise ratio (OSNR) tolerance property according to a modulation method of an optical signal is higher than a predetermined value and information representing which wavelength band has a superior OSNR tolerance property and which wavelength band has an inferior OSNR tolerance properly among wavelength bands including an expanded band expanded by expanding the amplification band, and move an optical signal modulated by a modulation method of a low OSNR tolerance property to a wavelength band having a superior OSNR tolerance property, in case of the rearrangement of wavelengths.

* * * * *

UNITED STATES PATENT AND TRADEMARK OFFICE
CERTIFICATE OF CORRECTION

| | |
|---|---|
| PATENT NO. | : 8,666,252 B2 |
| APPLICATION NO. | : 13/420043 |
| DATED | : March 4, 2014 |
| INVENTOR(S) | : Nishihara et al. |

Page 1 of 1

It is certified that error appears in the above-identified patent and that said Letters Patent is hereby corrected as shown below:

In the Claims

Column 14, Line 52, In Claim 8, delete "properly" and insert -- property --, therefor.

Signed and Sealed this
Twenty-seventh Day of May, 2014

Michelle K. Lee
*Deputy Director of the United States Patent and Trademark Office*